US012137477B2

(12) United States Patent
Chou et al.

(10) Patent No.: US 12,137,477 B2
(45) Date of Patent: Nov. 5, 2024

(54) SYSTEM AND METHOD FOR SCHEDULING AN UPLINK TRANSMISSION ASSIGNMENT

(71) Applicant: GOOGLE LLC, Mountain View, CA (US)

(72) Inventors: Kao-Peng Chou, Taoyuan (TW); Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 17/766,617

(22) PCT Filed: Oct. 6, 2020

(86) PCT No.: PCT/US2020/054399
§ 371 (c)(1),
(2) Date: Apr. 5, 2022

(87) PCT Pub. No.: WO2021/071834
PCT Pub. Date: Apr. 15, 2021

(65) Prior Publication Data
US 2024/0057153 A1  Feb. 15, 2024

Related U.S. Application Data

(60) Provisional application No. 62/911,936, filed on Oct. 7, 2019.

(51) Int. Cl.
*H04W 74/0808* (2024.01)
*H04W 72/1268* (2023.01)
(Continued)

(52) U.S. Cl.
CPC ... *H04W 74/0808* (2013.01); *H04W 72/1268* (2013.01); *H04W 74/0833* (2013.01); *H04W 74/0836* (2024.01)

(58) Field of Classification Search
CPC ... H04L 5/0032; H04L 5/0044; H04L 5/0048; H04L 5/0053; H04L 5/0091;
(Continued)

(56) References Cited

U.S. PATENT DOCUMENTS

2017/0289869 A1* 10/2017 Nogami ............ H04W 36/0077
2019/0098658 A1    3/2019 Noh et al.
(Continued)

OTHER PUBLICATIONS

International Search Report and Written Opinion for Application No. PCT/US2020/054399, dated Nov. 30, 2020.
(Continued)

*Primary Examiner* — Thomas R Cairns
(74) *Attorney, Agent, or Firm* — MARSHALL, GERSTEIN & BORUN LLP

(57) ABSTRACT

A user device (UE) for scheduling an uplink transmission assignment with a base station that communicates with the user device via a shared carrier, receives, from the base station, a configuration that indicates (i) a first channel access procedure for the user device to perform prior to transmitting an uplink transmission and (ii) at least one occasion at which the user device is to transmit the uplink transmission (1602); receives, from the base station via the shared carrier, a signal indicating at least a portion of a transmission time period during which the shared carrier is available to the base station (1604); and performs the first channel access procedure or a second channel access procedure before transmitting the uplink transmission based at least in part on whether the occasion is within the transmission time period (1606).

19 Claims, 21 Drawing Sheets

(51) Int. Cl.
*H04W 74/0833* (2024.01)
*H04W 74/0836* (2024.01)

(58) Field of Classification Search
CPC .............. H04L 27/0006; H04W 16/14; H04W 72/1268; H04W 72/23; H04W 74/006; H04W 74/0808; H04W 74/0833; H04W 74/0836
See application file for complete search history.

(56) References Cited

U.S. PATENT DOCUMENTS

2021/0329676 A1   10/2021  Yang et al.
2021/0392685 A1*  12/2021  Myung ............. H04W 72/1263

OTHER PUBLICATIONS

Nokia et al., "Feature Lead's Summary #2 on Channel Access Procedures," 3GPP Draft (2019).
Huawei et al., "Coexistence and Channel Access for NR Unlicensed Band Operations," 3GPP Draft (2019).
Samsung, "Channel Access Procedures for NR-U," 3GPP Draft (2019).
"3rd Generation Partnership Project; Technical Specification Group Radio Access Network; Physical layer procedures for shared spectrum channel access (Release 15)," 3GPP TS 37.213 V15.2.0 (2019).
"3rd Generation Partnership Project; Technical Specification Group Radio Access Network; Study on NR-based access to unlicensed spectrum (Release 16)," 3GPP TR 38.889 V16.0.0 (2018).
"5 GHz RLAN; Harmonised Standard Covering the Essential Requirements of Article 3.2 of Directive 2014/53/EU," ETSI EN 301 893 (2017).

* cited by examiner

SYSTEM AND METHOD FOR SCHEDULING AN UPLINK TRANSMISSION ASSIGNMENT

FIELD OF THE DISCLOSURE

This disclosure relates to wireless communications and, more particularly, to scheduling the transmission of control channel information in an unlicensed or otherwise shared spectrum.

BACKGROUND

This background description is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some wireless communication networks allow compatible devices to share an unlicensed carrier with other radio access technologies. In such cases, to avoid unfair use of the shared medium, devices operating in the unlicensed carrier typically need to perform channel access procedures before transmitting messages. In particular, a device may need to listen for other communications (i.e., detect energy) on the unlicensed carrier before using the carrier to transmit information, thereby reducing or eliminating interference with the communications of other networks/devices.

The 3rd Generation Partnership Project (3GPP) specification for fifth-generation (5G) radio access ("NR") networks, and specifically 3GPP TS 38.899 v16.0.0 (addressing the use of unlicensed carriers for 5G NR devices under what is commonly referred to as the "NR-U" study item), attempts to maintain fair co-existence with other radio access technologies such as WiFi® (IEEE 802.11) by requiring that 5G NR devices perform a "listen-before-talk" (LBT) procedure before transmitting via the unlicensed carrier. This restriction on usage of the unlicensed carrier can be problematic for communications that would otherwise be synchronized or tightly scheduled. In NR-U, for example, a base station (e.g., a gNB) must perform a successful LBT procedure to establish a channel occupancy time (COT) before using the unlicensed carrier. The UE must also perform a successful LBT procedure to send an uplink transmission to the base station using a resource at an occasion configured by the base station if the UE determines that the occasion is within the COT established by the base station. The UE is not authorized to transmit using the resource at the occasion when the COT is underway unless the UE is aware of the COT.

However, the 3GPP specification does not address the scenario in which the base station provides an indication of the COT to the UE in connected state while the UE is still performing the LBT procedure or before the UE has initiated the LBT procedure. If the UE detects energy on the unlicensed carrier while performing the LBT procedure, the UE may not successfully complete the LBT procedure. Therefore, even if the UE receives an indication of the COT, the UE is not authorized to send the uplink transmission at the occasion when the COT is underway. Alternatively, if the UE continues to perform the LBT procedure after the COT, the UE is not authorized to successfully complete the LBT procedure. Therefore, even if the UE receives an indication of the COT, the UE is not authorized to send the uplink transmission at the occasion after the COT.

Further, if the UE is in idle state (e.g., RRC_IDLE) or inactive state (e.g., RRC_INACTIVE), the 3GPP specification does not specify any manner in which the base station may indicate the COT to the UE. The UE must successfully complete the LBT procedure on the unlicensed carrier in order to perform a random access procedure with the base station, but if the UE continues to detect energy on the unlicensed carrier while performing the LBT procedure or before the UE has initiated the LBT procedure, the UE may not successfully complete the LBT procedure prior to the occasion. Consequently, the UE cannot transmit a preamble at the occasion to perform the random access procedure.

SUMMARY

A base station of this disclosure (e.g., a gNB) communicates with a UE, and uses a channel access procedure (e.g., LBT) to gain access to a shared carrier. The base station configures the UE to monitor a control channel. Particularly, the base station provides the UE a configuration in a downlink transmission that includes (i) at least a first channel access procedure (e.g., Category 4 LBT) that the UE is to perform prior to transmitting an uplink transmission to the base station and (ii) an occasion at which the UE is to transmit the uplink transmission. Each "occasion" may represent a time or time window in which a base station can (i.e., according to a specification of the wireless communication network), but does not necessarily, transmit control channel information to the UE. The configuration may include one occasion or a temporal distribution of occasions that repeats once per time unit, where the time unit is fixed and may be of any suitable length or duration depending on the implementation (e.g., a time slot, a set of N contiguous or non-contiguous time slots, a subframe, etc.).

As noted above, the base station performs a channel access procedure to gain access to the shared carrier. When the channel access procedure is successful, the base station obtains or establishes a transmission time period (e.g., COT) during which the shared carrier is available to the base station, and as a result acquires a grant to the channel. The base station then provides the UE, via the shared carrier, a signal indicating at least a portion of the COT, regardless of the radio resource control (RRC) state of the UE (e.g., RRC_CONNECTED, RRC_INACTIVE, RRC_IDLE). In various implementations, the base station may send the UE a signal indicating that the COT has started, or a signal indicating the structure of the COT (e.g., COT length or duration), to inform the UE of the COT.

In some implementations, the base station configures the UE (e.g., via one or more radio resource control (RRC) messages, one or more medium access control (MAC) control elements, one or more downlink control information (DCI), etc.) to perform either the first channel access procedure or a different channel access procedure (i.e., a second channel access procedure) based at least in part on whether the occasion is within the COT. Before receiving the signal indicating at least a portion of the COT from the base station, the UE performs the first channel access procedure before the COT begins. Upon receiving the signal indicating at least a portion of the COT from the base station, if the UE determines that the occasion is not within the COT, the UE selectively performs the first channel access procedure.

If the UE determines that the occasion is within the COT, the UE selectively performs a second channel access procedure (e.g., Category 2 LBT) that requires the UE to monitor the unlicensed carrier for a shorter duration of time than that required in performing the first channel access procedure. By virtue of the shorter duration of time, the UE may increase its likelihood of successful completion of the second channel access procedure prior to the occasion. Alternatively, in some implementations, under fair co-existence considerations to other compatible devices sharing the unlicensed carrier that are configured to perform respective first channel access procedures, the UE may selectively perform the first channel access procedure. Otherwise, the other compatible devices may unfairly detect energy from the UE had the UE been configured to perform the second channel access procedure more frequently, thereby not being able to complete respective first channel access procedures.

One example embodiment of these techniques is a method for scheduling an uplink transmission assignment with a base station that communicates with the user device via a shared carrier. The method can be implemented in the user device using processing hardware and comprises receiving, from the base station, a configuration that indicates (i) a first channel access procedure for the user device to perform prior to transmitting an uplink transmission and (ii) at least one occasion at which the user device is to transmit the uplink transmission; receiving, from the base station via the shared carrier, a signal indicating at least a portion of a transmission time period during which the shared carrier is available to the base station when the user device is in connected state, idle state, or inactive state of a protocol for controlling radio resources; and performing the first channel access procedure or a second channel access procedure before transmitting the uplink transmission based at least in part on whether the occasion is within the transmission time period.

Another example embodiment of these techniques is a user device comprising processing hardware and configured to execute the method above.

Yet another example embodiment of these techniques is a method of providing control channel information to a user device that communicates with the base station via a shared carrier. The method can be implemented in the base station using processing hardware and comprises transmitting, to the user device, a configuration that indicates (i) a first channel access procedure for the user device to perform prior to transmitting an uplink transmission and (ii) at least one occasion at which the user device is to transmit the uplink transmission; determining, using a channel access procedure, that the shared carrier is available to the base station for a transmission time period; and transmitting a signal to the user device indicating at least a portion of the transmission time period during which the shared carrier is available to the base station, to cause the user device to perform the first channel access procedure or a second channel access procedure before transmitting the uplink transmission based at least in part on whether the occasion is within the transmission time period.

Another example embodiment of these techniques is a base station comprising processing hardware and configured to execute the method above.

DETAILED DESCRIPTION OF THE DRAWINGS

Using the techniques of this disclosure, a communication device such as a UE monitors a control channel on a shared carrier in a manner that ensures that a channel access procedure completes prior to starting a transmission (e.g., an uplink transmission that requires configuration of the UE via the control channel by the base station) upon receiving a COT indication from the base station. As the term is used herein, a "carrier" may be any type of frequency spectrum or band, which corresponds to at least one channel in a given radio access network. Moreover, as used herein, a "shared" carrier may be an unlicensed carrier that is shared by different radio access networks and/or technologies, or a carrier that is shared in some other way and/or for some other reason (e.g., a carrier shared only among the multiple devices of a single radio access network).

These techniques are discussed below primarily with reference to 5G NR technologies, and more specifically with reference to operation of the 5G NR network over an unlicensed carrier (i.e., NR-U operation). However, the techniques of this disclosure can apply to other radio access technologies, and/or to other types of shared carriers (e.g., licensed bands that are shared by devices of a single radio access network). In the case of licensed bands, a channel access procedure of the type described below may or may not be performed.

Figure 1:
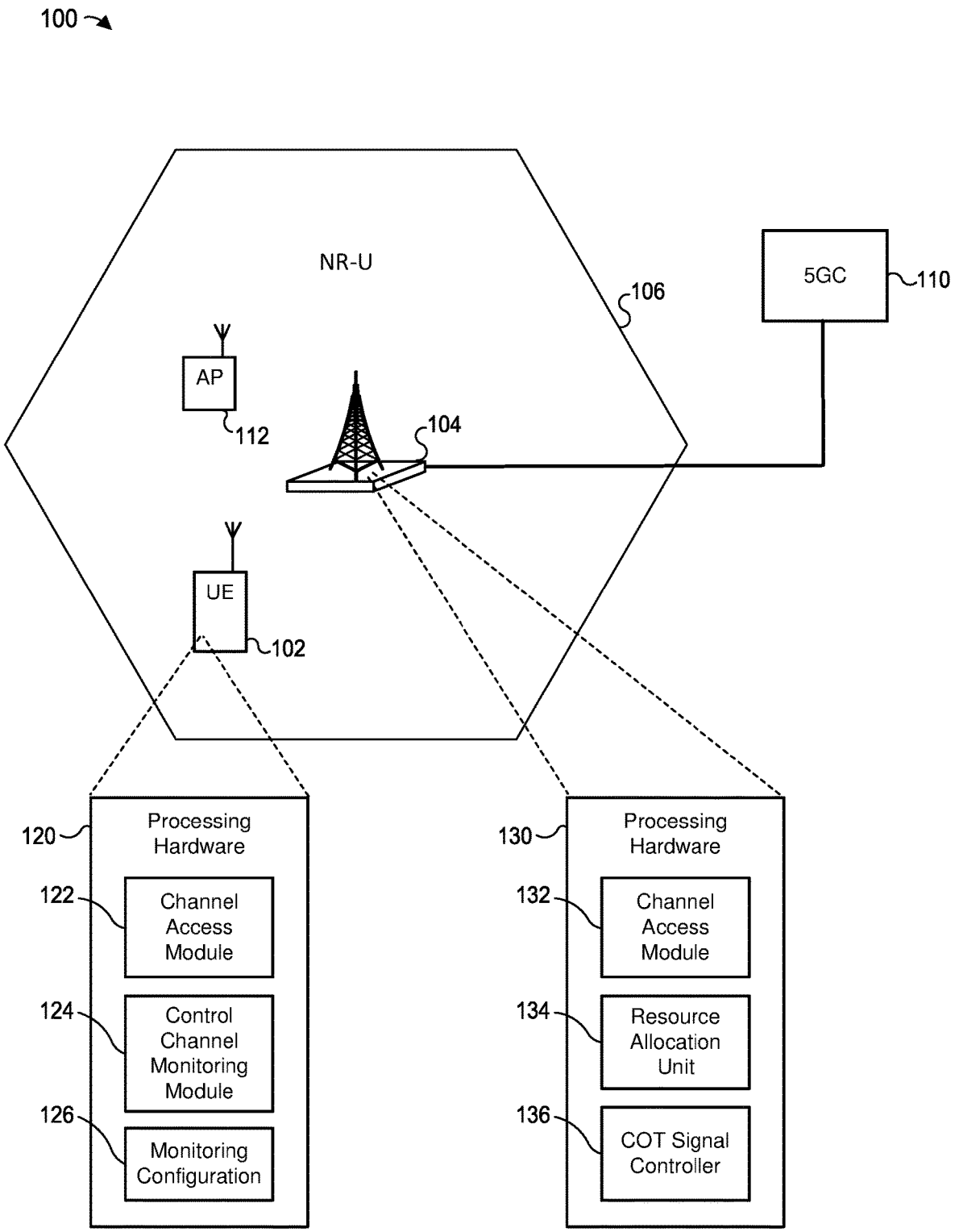
FIG. 1 is a block diagram of an example wireless communication network that implements the scheduling and channel monitoring techniques of this disclosure.

Referring first to FIG. 1, a wireless communication network 100 includes a UE 102, which can be any suitable device capable of wireless communications, as further discussed below. The wireless communication network 100 also includes a base station 104 associated with an NR-U cell 106 and connected (directly or indirectly) to a 5G core network (5GC) 110. The base station 104 may operate as a 5G Node B (gNB), a distributed unit gNB (gNB-DU), or an integrated access backhaul (IAB) node, for example. While FIG. 1 depicts the base station 104 as serving only the cell 106, it is understood that the base station 104 may also cover one or more additional cells not shown in FIG. 1. In general, the wireless communication network 100 can include any number of base stations, and each of the base stations may cover one, two, three, or any other suitable number of cells.

5G NR UEs operating in the cell 106, including the UE 102, can utilize an unlicensed carrier as well as portions of the radio spectrum allocated specifically to the service provider that operates the base station 104 and the 5GC 110. When exchanging data using the 5G NR air interface, the UE 102 and base station 104 may share the unlicensed carrier with other devices of other radio access networks. For example, other UEs (not shown in FIG. 1) may be subscribers of the service provider that operates the base station 104 and the 5GC 110, and be capable of communicating with the base station 104 via the unlicensed carrier. In addition, or alternatively, other UEs utilizing the unlicensed carrier may communicate with a base station or network node other than the base station 104, using a different radio access technology. FIG. 1 depicts an example of one such scenario, in which the UE 102 and base station 104 coexist with an access point (AP) 112. The AP 112 can utilize spectrum that includes, or is included within, at least a portion of the unlicensed carrier when operating in a wireless local area network (WLAN) according to one of the IEEE 802.11 standards. The AP 112 may be configured to communicate with one or more other devices not shown in FIG. 1, such as other UEs, for example. In other implementations and/or scenarios, the UE 102 and base station 104 also, or instead, coexist with devices operating according to other radio access technologies. In still another implementation and/or scenario, the base station 104 does not connect to the 5GC 110, and can operate as an AP (e.g., similar to AP 112). Thus, for example, the wireless communication network 100 may omit the 5GC 110, or only use the 5GC 110 in certain scenarios.

The UE 102 is equipped with processing hardware 120, which may include one or more general-purpose processors (e.g., CPUs) and a non-transitory computer-readable memory storing instructions that the one or more general-purpose processors can execute. Additionally or alternatively, the processing hardware 120 may include special-purpose processing units, such as a wireless communication chipset, for example. The processing hardware 120 includes a channel access module 122, control channel monitoring module 124, and the memory of the processing hardware 120 stores a monitoring configuration 126. The channel access module 122 and control channel monitoring module 124 may be implemented using any suitable combination of hardware, software, and/or firmware. Generally, the channel access module 122 may be configured to perform one or more types of channel access procedures (e.g., category 1 LBT, category 2 LBT, category 3 LBT, category 4 LBT), and the control channel monitoring module 124 may be configured to monitor occasions on a control channel at which the UE 102 is to transmit an uplink transmission. In one example implementation, the channel access module 122 and/or control channel monitoring module 124 includes a set of instructions that defines respective components of the operating system of the UE 102, and one or more CPUs of the processing hardware 120 execute these instructions to perform a channel access procedure and channel monitoring functionality. In another implementation, the channel access module 122 and/or control channel monitoring module 124 is implemented using firmware as a part of a wireless communication chipset.

In operation, the control channel monitoring module 124 monitors a control channel in accordance with the monitoring configuration 126, which the gNB 104 provides to the UE 102. In some implementations and/or scenarios, the control channel monitoring module 124 monitors a PDCCH. In other implementations and/or scenarios, however, the control channel monitoring module 124 monitors a group-common PDCCH (GC-PDCCH). The monitoring configuration 126 can indicate a channel access procedure (e.g., LBT procedure) that the channel access module 122 may perform prior to transmitting an uplink transmission to the base station 104, and at least one resource (i.e., time-frequency resource) at an occasion at which the UE 102 is to transmit the uplink transmission. Each "occasion" may represent a time or time window in which the gNB 104 can (i.e., according to a specification of the wireless communication network), but does not necessarily, transmit control channel information to the UE 102. The base station 104 may configure the UE 102 with a temporal distribution of occasions that repeats once per time unit, where the time unit is fixed and may be of any suitable length or duration depending on the implementation (e.g., a time slot, a set of N contiguous or non-contiguous time slots, a subframe, etc.). The base station 104 is equipped with processing hardware 130, which may include one or more general-purpose processors (e.g., CPUs) and a non-transitory computer-readable memory storing instructions that the one or more general-purpose processors can execute. Additionally or alternatively, the processing hardware 130 may include special-purpose processing units, such as a wireless communication chipset, for example. The processing hardware 130 in the example implementation of FIG. 1 includes a channel access module 132, a resource allocation unit 134, and a COT signal controller 136.

The channel access module 132 performs a channel access procedure, such as an LBT procedure, to gain access to the shared carrier in the NR-U cell 106. When the channel access procedure is successful, the channel access module 132 determines that the gNB 104 has obtained or established a COT and accordingly can transmit various signals during the COT. The resource allocation unit 134 allocates to the UE 102 the at least one resource at the occasion described above and provides an indication of a channel access procedure (e.g., LBT procedure) that the UE 102 may perform prior to transmitting an uplink transmission to the base station 104. The COT signal controller 136 determines when the gNB 104 transmits, to the UE 102, an indication that the gNB 104 has gained a COT. The COT signal controller 136, in some implementations, also determines which format the gNB 104 should utilize for the indication. Example functionality of the components 132, 134, and 136 is discussed in more detail below, with reference to various example scenarios and monitoring patterns. As discussed further below, based at least in part on whether the occasion is within the COT, the UE 102 can selectively perform the channel access procedure indicated by the gNB 104, or another channel access procedure known by the access module 122 of the UE 102.

For simplicity, FIG. 1 does not depict various components of the UE 102 and the base station 104. In addition to the components mentioned above, for example, the UE 102 and the base station 104 include respective transceivers, which comprise various hardware, firmware, and/or software components configured to transmit and receive wireless signals. The processing hardware 120 and the processing hardware 130 can send commands and exchange information with the respective transceivers as needed to perform various connection establishment procedures, perform various RRC or mobility management (MM), or communicate with other network elements, etc.

FIGS. 2A-8 illustrate several example configurations according to which the gNB 104 can provide a COT indication to the UE 102, which in response can successfully perform a channel access procedure prior to transmitting an uplink transmission to the gNB 104. Generally speaking, the UE 102 monitors occasions at least two respective time intervals: before the gNB 104 gains access to the shared carrier and after the UE 102 receives an indication that the gNB 104 has gained access to the shared carrier. The UE 102 also selectively performs one of at least two types of channel access procedures in order to be able to transmit an uplink transmission to the gNB 104 in anticipation of the gNB 104 gaining access to the shared carrier and providing an indication (e.g., COT indication) to the UE 102 that the gNB 104 has gained access to the shared carrier. Generally, the UE 102 requires less time to complete one of the two channel access procedures (e.g., Category 2 LBT) than the other (e.g., Category 4 LBT). In some embodiments, instead of the channel access procedure indicated by the gNB 104 (i.e., a first channel access procedure), the UE 102 may selectively perform, a different channel access procedure (i.e., a second channel access procedure) that requires less time to complete (than the first channel access procedure if the UE 102 receives a COT indication that the gNB 104 has gained access to the shared carrier, and the occasion at this time interval is within the COT. In other embodiments, under fair co-existence considerations to other compatible devices sharing the carrier that are configured to perform the first channel access procedure, the UE 102 may selectively perform the first channel access procedure.

Now turning to FIGS. 2A-2B and 3-4, these figures generally illustrate example message flow diagrams for a UE performing a channel access procedure when a base station (i) establishes a COT while the UE has already initiated the same or different channel access procedure, and (ii) provides the UE with an occasion, within the COT, at which the UE can transmit an uplink transmission to the base station.

Figure 2A:
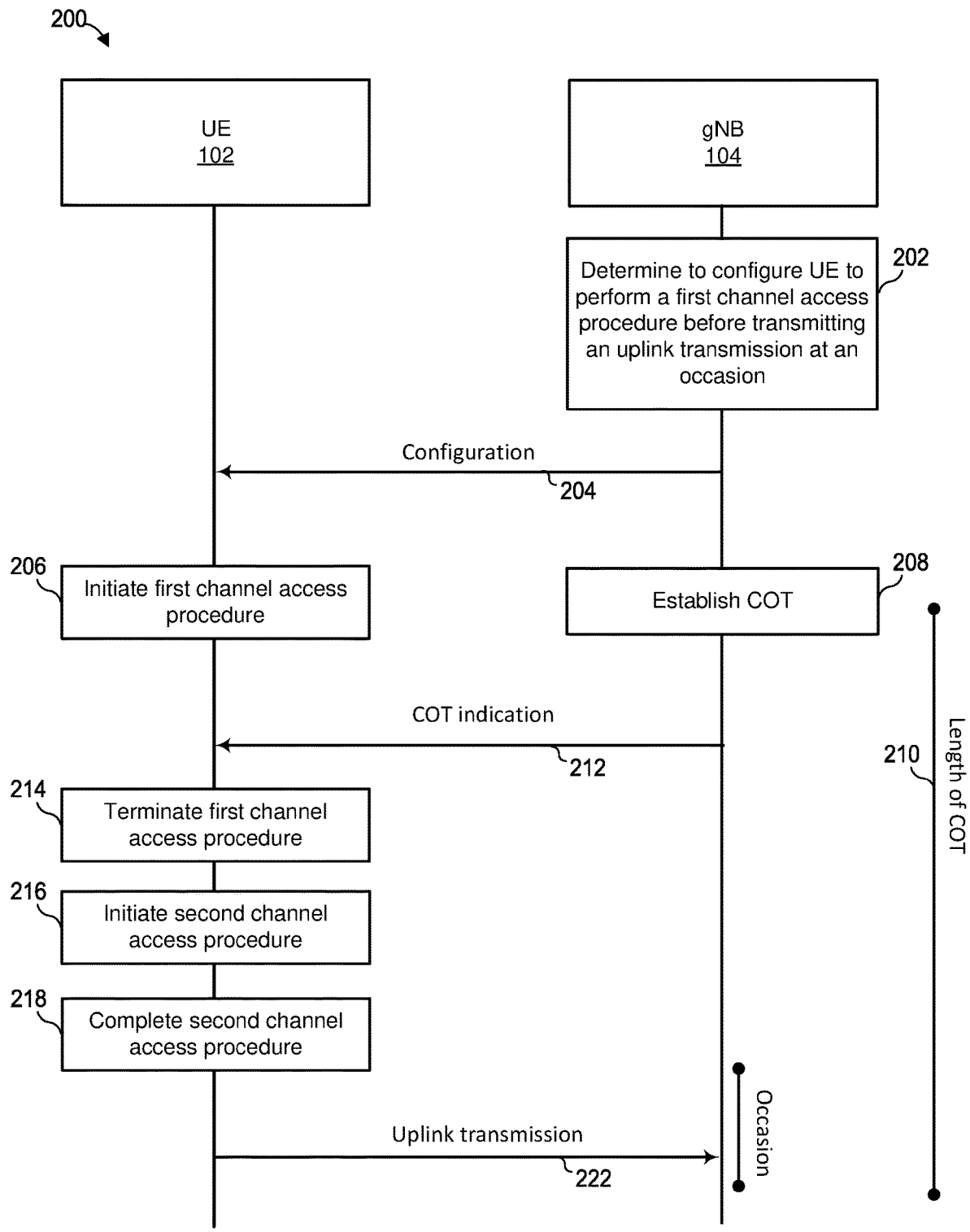
FIG. 2A is an example message flow diagram for a UE performing a second channel access procedure when a base station (i) establishes a COT while the UE has already initiated a first channel access procedure, and (ii) provides the UE with an occasion, within the COT, at which the UE can transmit an uplink transmission to the base station.

Referring first to FIG. 2A, the UE 102 is in connected state of the RAT protocol for controlling radio resources (e.g., NR-RRC CONNECTED) with gNB 104 in an example scenario 200, and the gNB 104 generally configures the UE 102 to monitor a control channel (e.g., PDCCH), such as via a configuration in a downlink transmission (e.g., a physical downlink control channel (PDCCH), a physical downlink shared channel (PDSCH), a channel state information reference signal (CSI-RS), a synchronization signal block (SSB)), an RRC message (e.g., a RRCReconfiguration message) on the PDSCH, or a first DCI on the PDCCH. Specifically, the gNB 104 determines 202 to configure the UE 102 with an uplink grant indicating that the UE 102 can transmit the uplink transmission on a certain physical uplink shared channel (PUSCH) using a resource at a certain occasion (e.g., PDCCH occasion), where the occasion can occur at a time slot, a set of N contiguous or non-contiguous time slots, a subframe, etc. The gNB 104 also determines 202 a certain channel access procedure (e.g., a first channel access procedure) that the UE 102 should use prior to transmitting the uplink transmission at the occasion. The gNB 104 indicates 204 the channel access procedure and occasion to the UE 102, such as by transmitting one or more configuration messages to the UE 102 with an implicit or explicit indicator identifying the channel access procedure via the shared carrier, or by transmitting, at the occasion, a DCI which can include the uplink grant indicating that the UE 102 can transmit the uplink transmission on a certain physical uplink shared channel (PUSCH).

With continued reference to FIG. 2A, upon receiving (e.g., using control channel monitoring module 124) the configuration message (e.g., monitoring configuration 126), the UE 102 initiates 206 the first channel access procedure (e.g., using channel access module 122). While the UE 102 performs the first channel access procedure, the gNB 104 gains access to the shared carrier to establish 208 the COT. After the gNB 104 establishes the COT (e.g., using channel access module 132), the gNB 104 indicates to the UE 102 that the COT has started (e.g., using resource allocation unit 134). To indicate to the UE 102 that the COT has started, the gNB 104 may transmit 212 a signal (e.g., any suitable signal generated by COT signal controller 136) generally indicating that the COT has started (i.e., a COT indication). The COT indication may include a structure of the COT (e.g., the duration or length 210 of COT). The gNB 104 may not include the first channel access procedure that the UE 102 should perform in the COT indication. In some embodiments, the gNB 104 indicates 212 the COT duration in a broadcast message. In yet other embodiments, the base station 104 includes the signal in a second DCI with a CRC scrambled by a radio network temporary identifier (RNTI) (e.g., a slot formation indicator RNTI (SFI-RNTI) or a COT-RNTI). The UE 102 may receive the RNTI in an RRCReconfiguration message from the gNB 104. In one implementation, the UE 102 may unscramble the CRC with the RNTI to obtain the second DCI and then decode the second DCI to obtain the COT indication. In another implementation, the UE 102 may calculate a CRC from the second DCI, scramble the UE-calculated CRC with the RNTI to obtain the second DCI, and then decode the second DCI to obtain the COT indication. The RRCReconfiguration message and/or the COT indication may include a slot format configuration.

In response to such COT indication, if the UE 102 determines that the occasion is within the COT (e.g., length 210), the UE 102 terminates 214 the first channel access procedure and initiates 216 a second channel access procedure having a different type as that of the first channel access procedure on the unlicensed carrier frequency (e.g., using channel access module 122), in some embodiments. By virtue of the shorter duration of time required to perform the second channel access procedure, the UE 102 advantageously increases its likelihood of successfully completing the second channel access procedure prior to the occasion. As such, the UE 102 is likely to complete 218 the second channel access procedure, and subsequently transmit 222 an uplink transmission to the gNB 104 at the occasion (e.g., indicated in the configuration message by gNB 104). Had the UE 102 performed the first channel access procedure as indicated by the gNB 104, the UE 102 may have failed to complete the first channel access procedure prior to the occasion, in which case the UE 102 would not be authorized to transmit the uplink transmission at the occasion.

Figure 2B:
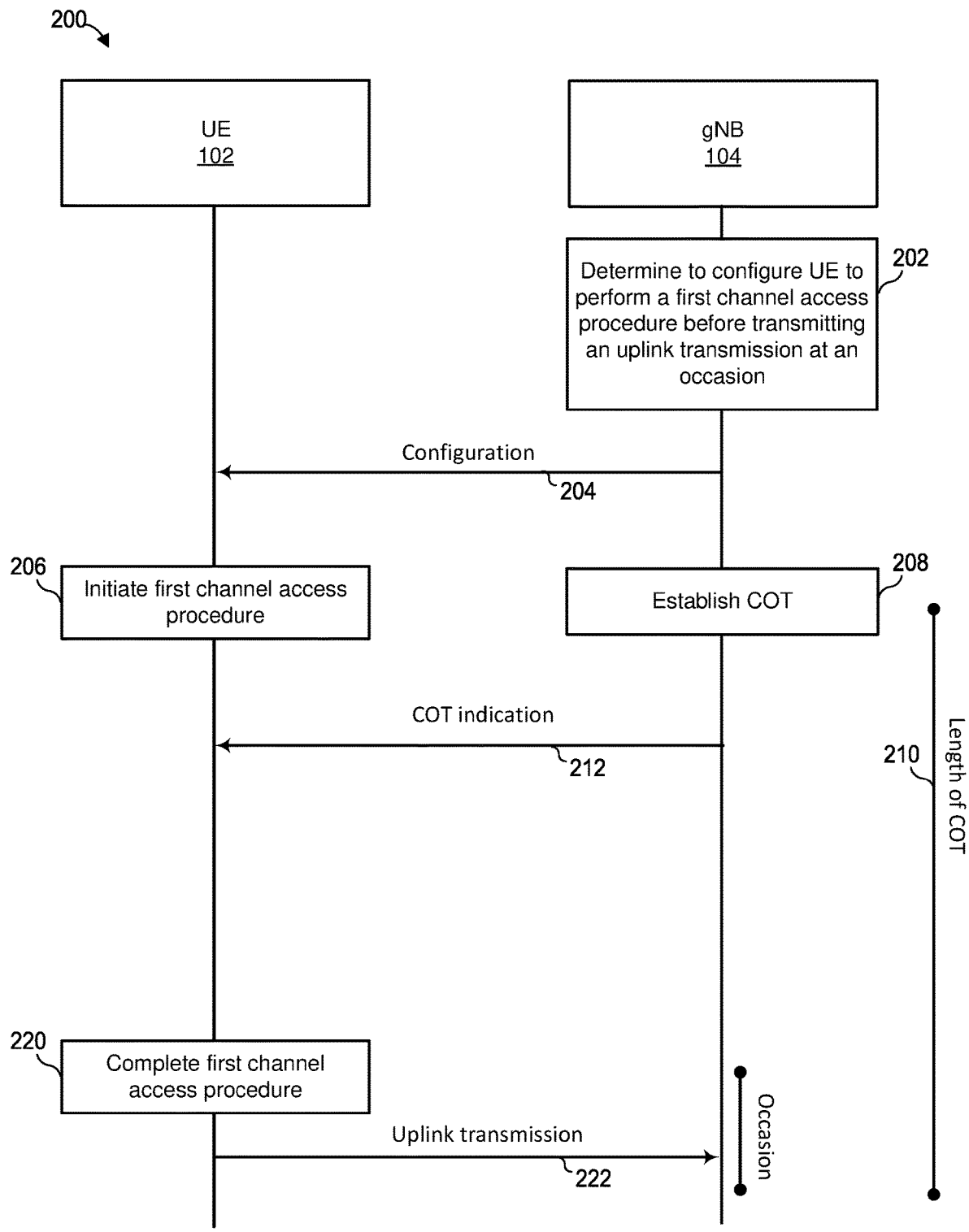
FIG. 2B is an example message flow diagram for a UE completing a first channel access procedure when a base station (i) establishes a COT while the UE has already initiated the first channel access procedure, and (ii) provides the UE with an occasion, within the COT, at which the UE can transmit an uplink transmission to the base station.

In other embodiments, under fair co-existence considerations to other compatible devices sharing the unlicensed carrier that are configured to perform respective first channel access procedures, the UE 102 may continue to perform and complete the first channel access procedure in response to the COT indication, as illustrated in event 220 of FIG. 2B, and subsequently transmit 222 the uplink transmission to the gNB 104 at the occasion. That is, the UE 102 continues to perform the first type channel access procedure, even if the UE 102 determines that the occasion is within the COT.

In some embodiments, the uplink transmission is a PUSCH transmission. The UE 102 can transmit a medium access control (MAC) protocol data unit (PDU), a hybrid automatic repeat request (HARQ) acknowledgement (ACK), a HARQ negative acknowledgement (NACK), and/or channel state information (CSI) in the PUSCH transmission on the resource at the occasion. In other embodiments, the uplink transmission is a physical uplink control channel (PUCCH) transmission. The UE 102 can transmit a HARQ ACK(s), a HARQ NACK(s) and/or CSI in the PUCCH transmission on the resource at the occasion. In further embodiments, the uplink transmission includes a sounding reference signal (SRS), a random access (RA) preamble, or message A (MsgA) (i.e., a RA preamble and a PUSCH transmission).

Figure 3:
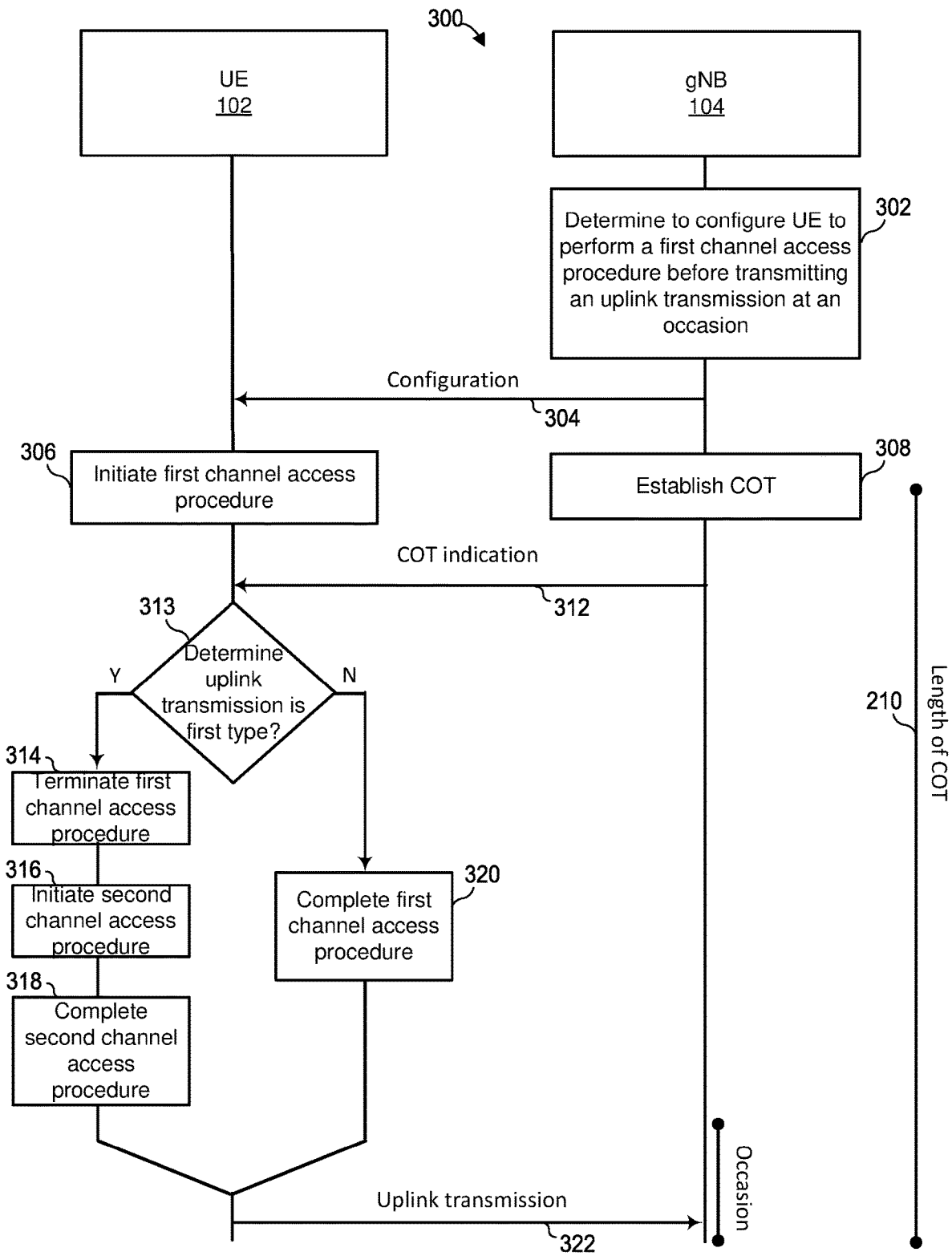
FIG. 3 is an example message flow diagram for a UE performing a second channel access procedure or completing a first channel access procedure based at least in part on an uplink transmission type when a base station (i) establishes a COT while the UE has already initiated the first channel access procedure, and (ii) provides the UE with an occasion, within the COT, at which the UE can transmit the uplink transmission to the base station.

Now referring to FIG. 3, at the beginning of a scenario 300, the UE 102 is in connected state with gNB 104. The UE 102 and base station 104 proceed to events 302, 304, 306, 308 and 312, similar to events 202, 204, 206, 208, and 212.

In response to receiving the COT indication, the UE 102 performs either the first channel access procedure or the second channel access procedure by determining 313 the type of uplink transmission. If the uplink transmission is of a first type, the UE 102 can terminate 314 the first channel access procedure, initiate 316 the second channel access procedure, and complete 318 the second channel access procedure, similar to events 214, 216, and 218. Otherwise, if the uplink transmission is of a second type, the UE 102 can continue to perform and complete 320 the first channel access procedure, similar to event 220. In some embodiments, the first type can be PUSCH, and the second type can be SRS, or vice versa. In other embodiments, the first type can be PUSCH, and the second type can be PUCCH, or vice versa. In yet other embodiment, the first type can be PUCCH, and the second type can be SRS, or vice versa.

In response to either completing 318 the second channel access procedure or completing 320 the first channel access procedure, the UE 102 transmits 322 an uplink transmission to the gNB 104 at the occasion, similar to event 222.

Figure 4:
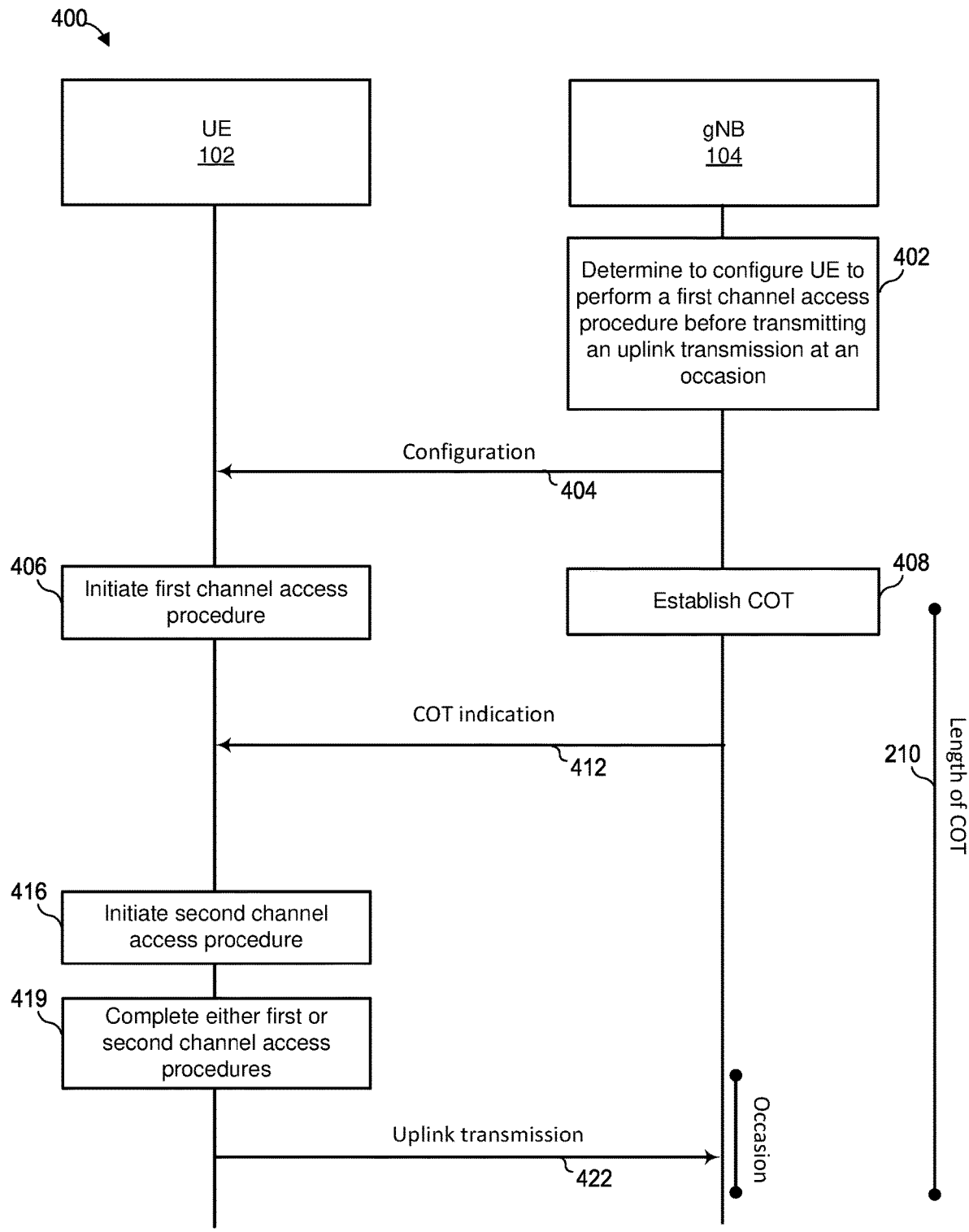
FIG. 4 is an example message flow diagram for a UE performing a first channel access procedure and a second channel access procedure in parallel when a base station (i) establishes a COT while the UE has already initiated the first channel access procedure, and (ii) provides the UE with an occasion, within the COT, at which the UE can transmit an uplink transmission to the base station.

Now referring to FIG. 4, at the beginning of a scenario 400, the UE 102 is in connected state with gNB 104. The UE 102 and base station 104 proceed to events 402, 404, 406, 408 and 412, similar to events 202, 204, 206, 208, and 212.

In response to receiving the COT indication, the UE 102 initiates 416 the second channel access procedure. Accordingly, the UE 102 performs the first channel access procedure and the second channel access procedure in parallel. In some embodiments, if the UE 102 completes the second channel access procedure while performing the first type channel access procedure, the UE 102 may terminate the first channel access procedure. In other embodiments, if the UE 102 completes the second type channel access procedure while performing the first type channel access procedure, the UE 102 may continue performing the first type channel access procedure. In yet other embodiments, if the UE 102 completes the first channel access procedure while performing the second channel access procedure, the UE 102 may terminate the second channel access procedure. In yet other embodiments, if the UE 102 completes the first type channel access procedure while performing the second channel access procedure, the UE 102 may continue performing the second channel access procedure. Accordingly, the UE 102 completes 419 the first channel access procedure and/or the second channel access procedure.

In response to completing the first channel access procedure and/or the second channel access procedure, the UE 102 transmits 422 an uplink transmission to the gNB 104 at the occasion, similar to event 222.

Figure 5A:
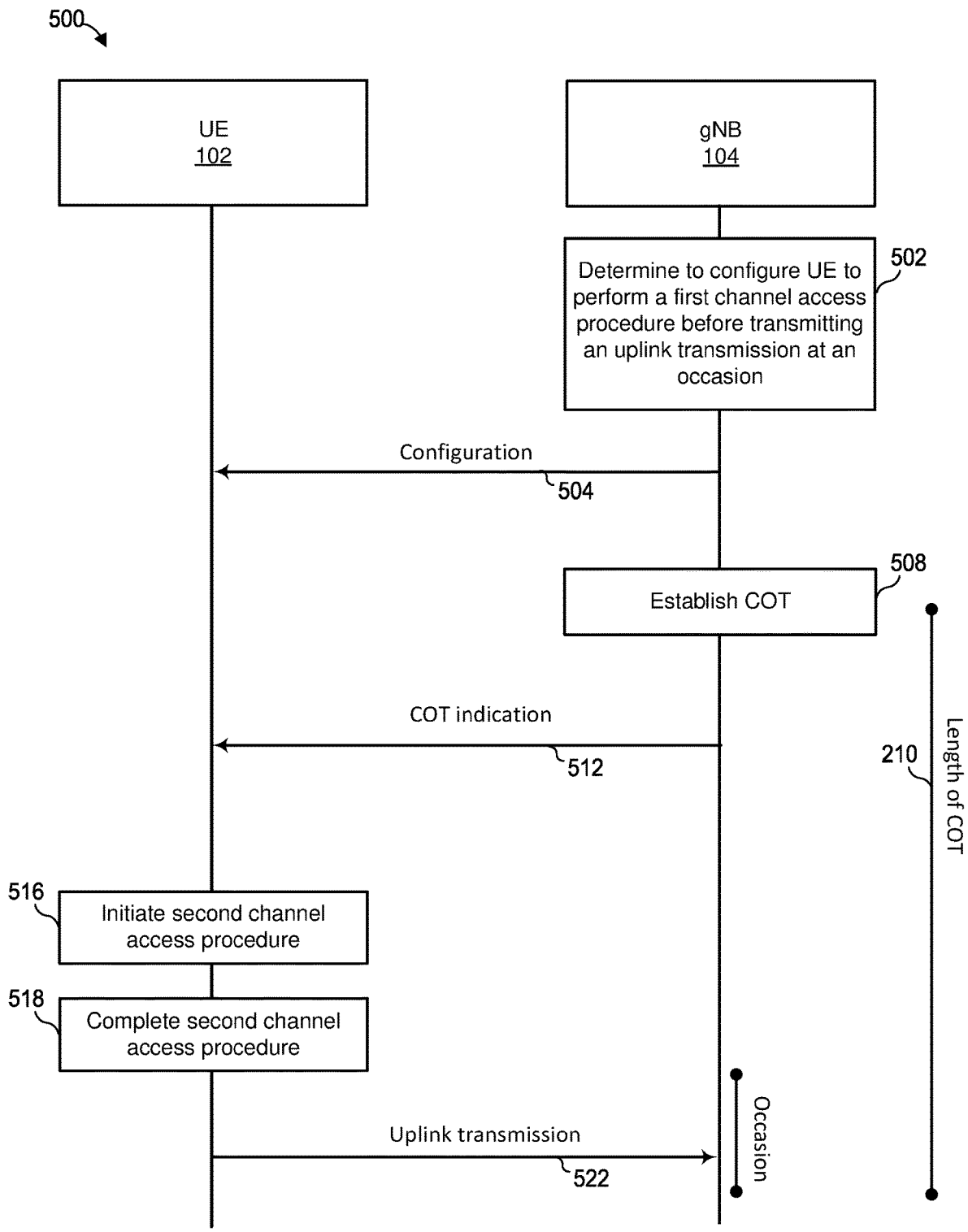
FIG. 5A is an example message flow diagram for a UE performing a second channel access procedure when a base station (i) establishes a COT before the UE has initiated the second channel access procedure, and (ii) provides the UE with an occasion, within the COT, at which the UE can transmit an uplink transmission to the base station.
Figure 5B:
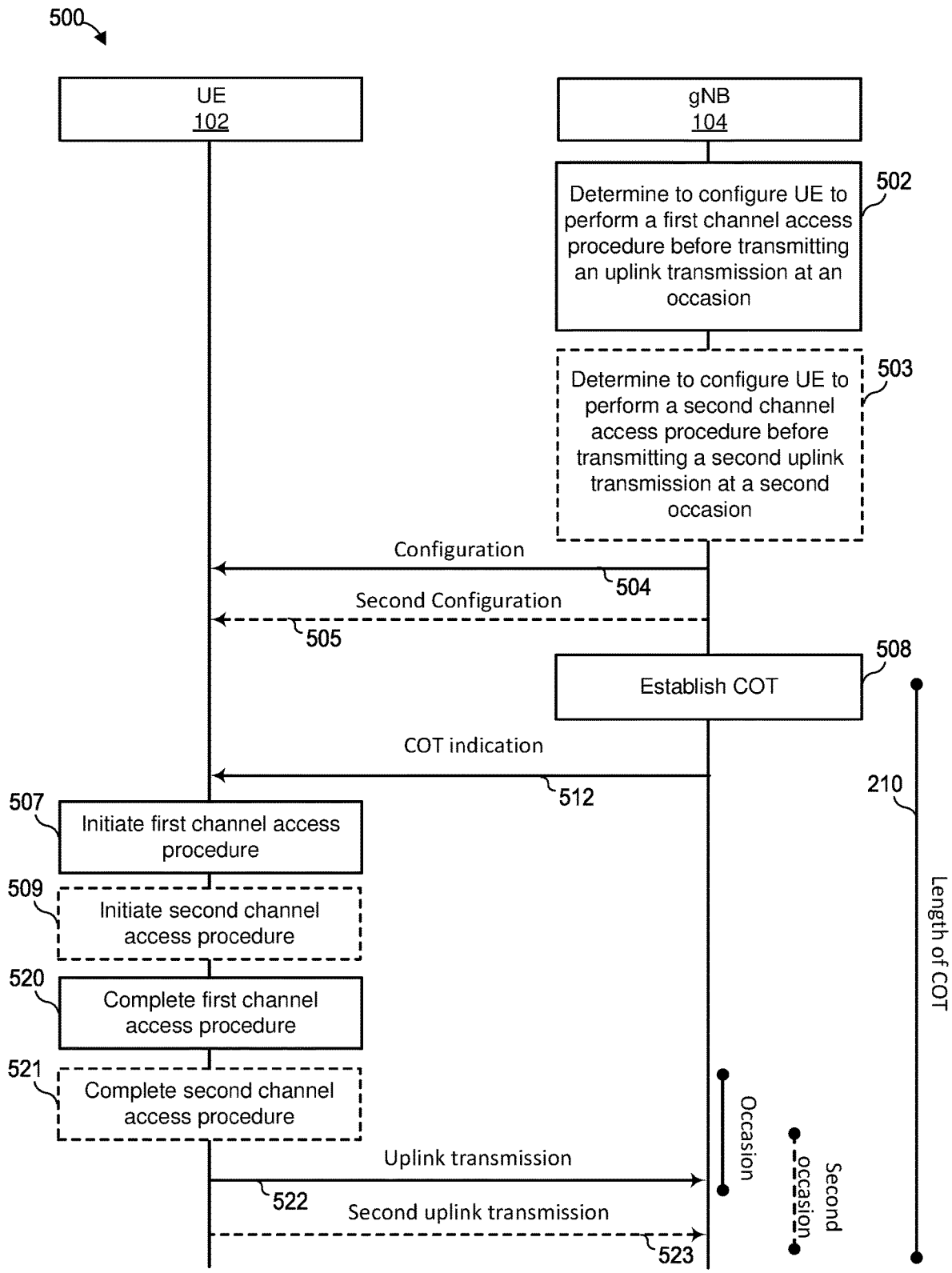
FIG. 5B is an example message flow diagram for a UE performing a first channel access procedure when a base station (i) establishes a COT before the UE has initiated the first channel access procedure, and (ii) provides the UE with an occasion, within the COT, at which the UE can transmit an uplink transmission to the base station.
Figure 6:
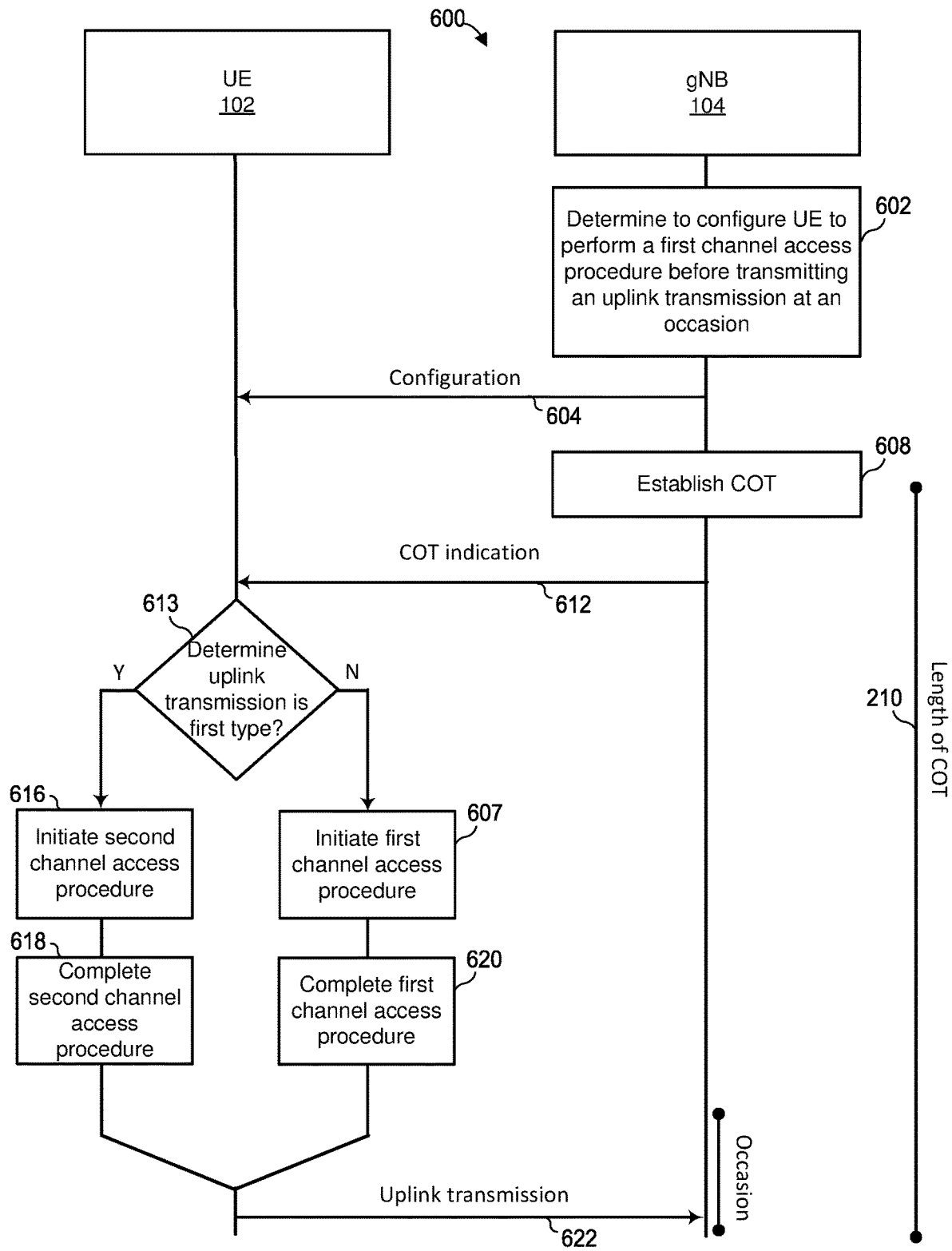
FIG. 6 is an example message flow diagram for a UE performing a first channel access procedure or a second channel access procedure based at least in part on an uplink transmission type when a base station (i) establishes a COT before the UE has initiated the channel access procedure, and (ii) provides the UE with an occasion, within the COT, at which the UE can transmit the uplink transmission to the base station.

Now turning to FIGS. 5A-5B and 6, these figures generally illustrate example message flow diagrams for a UE performing a channel access procedure when a base station (i) establishes a COT before the UE has initiated the channel access procedure, and (ii) provides the UE with an occasion, within the COT, at which the UE can transmit an uplink transmission to the base station.

Now referring to FIG. 5A, at the beginning of a scenario 500, the UE 102 is in connected state with gNB 104. The UE 102 and base station 104 proceed to events 502 and 504, similar to events 202 and 204. In contrast to the scenario 200 in which UE 102 initiates the first channel access procedure while the gNB 104 establishes the COT and subsequently receives the COT indication from the gNB 104 after initiating the first channel access procedure, UE 102 of scenario 500 initiates 516 the second channel access procedure instead of the first channel access procedure, similar to event 216, after the gNB 104 establishes 508 the COT, and after receiving 512 the COT indication, similar to event 212. Accordingly, the UE 102 does not initiate the first channel access procedure at all, despite receiving 504 a configuration indicating the UE 102 to perform the first channel access procedure.

As such, the UE 102 is likely to complete 518 the second channel access procedure, and subsequently transmit 522 an uplink transmission to the gNB 104 at the occasion, similar to events 218 and 212.

In other embodiments, under fair co-existence considerations to other compatible devices sharing the unlicensed carrier that are configured to perform respective first channel access procedures, the UE 102 may initiate 507 the first channel access procedure after receiving 512 the COT indication, similar to event 212, complete the first channel access procedure in response to the COT indication, as illustrated in event 520 of FIG. 5B, and subsequently transmit 522 the uplink transmission to the gNB 104 at the occasion, similar to event 222. That is, the UE 102 continues to perform the first type channel access procedure, even if the UE 102 determines that the occasion is within the COT.

In yet other embodiments, as illustrated in event 503 of FIG. 5B, the gNB 104 may, alternatively or in addition to determining the UE 102 with a configuration as shown in event 502, determine 503 to configure the UE 102 with a second uplink grant indicating that the UE 102 can transmit a second uplink transmission on a certain physical uplink shared channel (PUSCH) using a second resource at a second occasion (e.g., a second PDCCH occasion), where the second occasion can occur at a time slot, a set of N contiguous or non-contiguous time slots, a subframe, etc. The gNB 104 also determines 503 another channel access procedure (e.g., a second channel access procedure) that the UE 102 should use prior to transmitting the second uplink transmission at the second occasion. The gNB 104 indicates 505 the second channel access procedure and second occasion to the UE 102, such as by transmitting one or more second configuration messages to the UE 102 with an implicit or explicit indicator identifying the second channel access procedure via the shared carrier, or by transmitting, at the second occasion, a second DCI which can include the uplink grant indicating that the UE 102 can transmit the second uplink transmission on a second PUSCH, or by transmitting at the first occasion. Other ways of indicating 504, 505 the configuration and second configuration are contemplated, such as via a first RRC message and a second RRC message, respectively.

In response to receiving 512 the COT indication, if the UE 102 determines that the second occasion is within the COT, the UE 102 initiates 509 the second channel access procedure having a different type as that of the first channel access procedure on the unlicensed carrier frequency, and completes 521 the second channel access procedure before transmitting 523 the second uplink transmission to the gNB 104.

Now referring to FIG. 6, at the beginning of a scenario 600, the UE 102 is in connected state with gNB 104. The UE 102 and base station 104 proceed to events 602, 604, 608 and 612, similar to events 502, 504, 508 and 512.

In response to receiving the COT indication, the UE 102 performs either the first channel access procedure or the second channel access procedure by determining 613 the type of uplink transmission, similar to event 313. If the uplink transmission is of a first type, the UE 102 can initiate 616 the second channel access procedure, and complete 618 the second channel access procedure, similar to events 316, and 318. Otherwise, if the uplink transmission is of a second type, the UE 102 initiates 607 the first channel access procedure, and completes 620 the first channel access procedure, similar to event 320. In some embodiments, the first type can be PUSCH, and the second type can be SRS, or vice versa. In other embodiments, the first type can be PUSCH, and the second type can be PUCCH, or vice versa. In yet other embodiment, the first type can be PUCCH, and the second type can be SRS, or vice versa.

In response to either completing 618 the second channel access procedure or completing 620 the first channel access procedure, the UE 102 transmits 622 an uplink transmission to the gNB 104 at the occasion, similar to event 322.

Now turning to FIGS. 7A-7B and 8-9, these figures generally illustrate example message flow diagrams for a UE performing a channel access procedure when a base station (i) establishes a COT while the UE has already initiated a RACH procedure and the same or different channel access procedure, and (ii) provides the UE with an occasion, within the COT, at which the UE can transmit an uplink transmission to the base station.

Figure 7A:
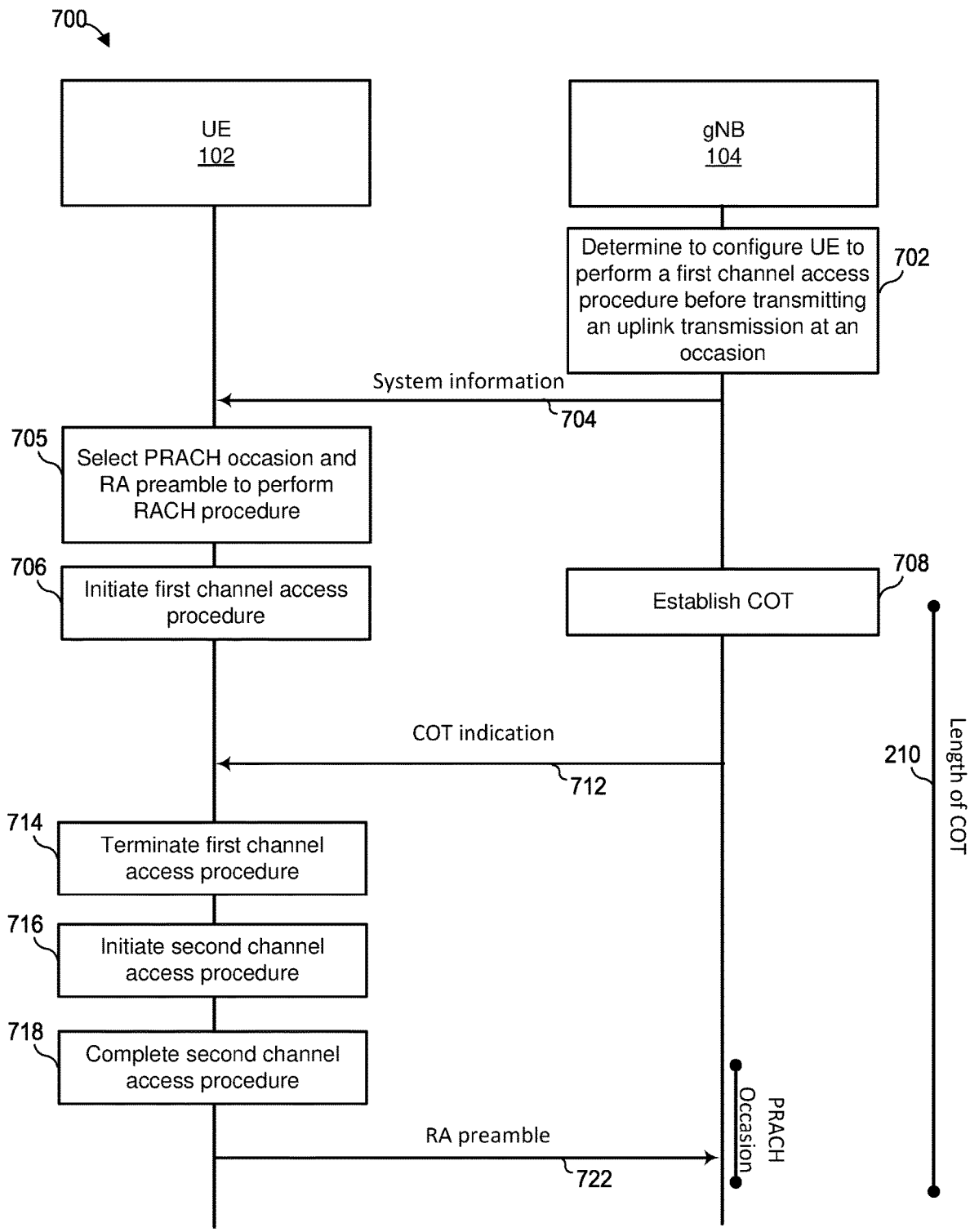
FIG. 7A is an example message flow diagram for a UE performing a second channel access procedure when a base station (i) establishes a COT while the UE has already initiated a RACH procedure and a first channel access procedure, and (ii) provides the UE with an occasion, within the COT, at which the UE can transmit an uplink transmission to the base station.

Now referring to FIG. 7A, at the beginning of a scenario 700, the UE 102 is in idle or inactive state (e.g., NR-RRC IDLE, NR-RRC INACTIVE) (i.e., a disengaged state) with gNB 104, and the gNB 104 generally determines 702 to configure the UE 102 to initiate a random access channel (RACH) procedure, such as by broadcasting 704 information (e.g., physical RACH (PRACH) occasion and RA preamble) associated with a RACH procedure in system information on the shared carrier to the UE 102. In some embodiments, the system information includes a first SIB and a second SIB that respectively include the RACH procedure-associated information and the RNTI. In other embodiments, the system information includes an SIB that includes both the RACH procedure-associated information and the RNTI. In yet other embodiments, the system information includes an SIB that includes an energy detection threshold value for the UE 102 to perform the first channel access procedure and/or the second channel access procedure. The gNB 104 also broadcasts 702 a certain channel access procedure (e.g., a first channel access procedure) that the UE 102 should use prior to transmitting the RA preamble at the PRACH occasion. Accordingly, the gNB 104 indicates 704 the channel access procedure, RA preamble, and PRACH occasion to the UE 102 via broadcasting system information.

With continued reference to FIG. 7A, in response to receiving the broadcasted system information, the UE 102 selects the PRACH occasion and the RA preamble to initiate 705 the RACH procedure. To ultimately transmit the RA preamble at the PRACH occasion to the gNB 104, the UE 102 initiates 706 the RACH procedure as a first channel access procedure, similar to event 206. While the UE 102 performs the first channel access procedure, the gNB 104 gains access to the shared carrier to establish 708 the COT, similar to event 208. After the gNB 104 establishes the COT (e.g., using channel access module 132), the gNB 104 indicates to the UE 102 that the COT has started. To indicate to the UE 102 that the COT has started, the gNB 104 may transmit 712 a COT indication, similar to event 212. The COT indication may include a structure of the COT (e.g., the duration or length 210 of COT).

In response to such COT indication, if the UE 102 determines that the PRACH occasion is within the COT (e.g., length 210), the UE 102 terminates 714 the first channel access procedure and initiates 716 a second channel access procedure having a different type as that of the first channel access procedure on the unlicensed carrier frequency, similar to events 214 and 216, in some embodiments. By virtue of the shorter duration of time required to perform the second channel access procedure, the UE 102 advantageously increases its likelihood of successfully completing the second channel access procedure prior to the PRACH occasion. As such, the UE 102 is likely to complete 718 the second channel access procedure, similar to event 218, and subsequently transmit 722 the RA preamble to the gNB 104 at the PRACH occasion (e.g., indicated in the broadcasted system information by gNB 104). Had the UE 102 performed the first channel access procedure as indicated by the gNB 104, the UE 102 may have failed to complete the first channel access procedure prior to the PRACH occasion, in which case the UE 102 would not be authorized to transmit the RA preamble at the PRACH occasion.

Figure 7B:
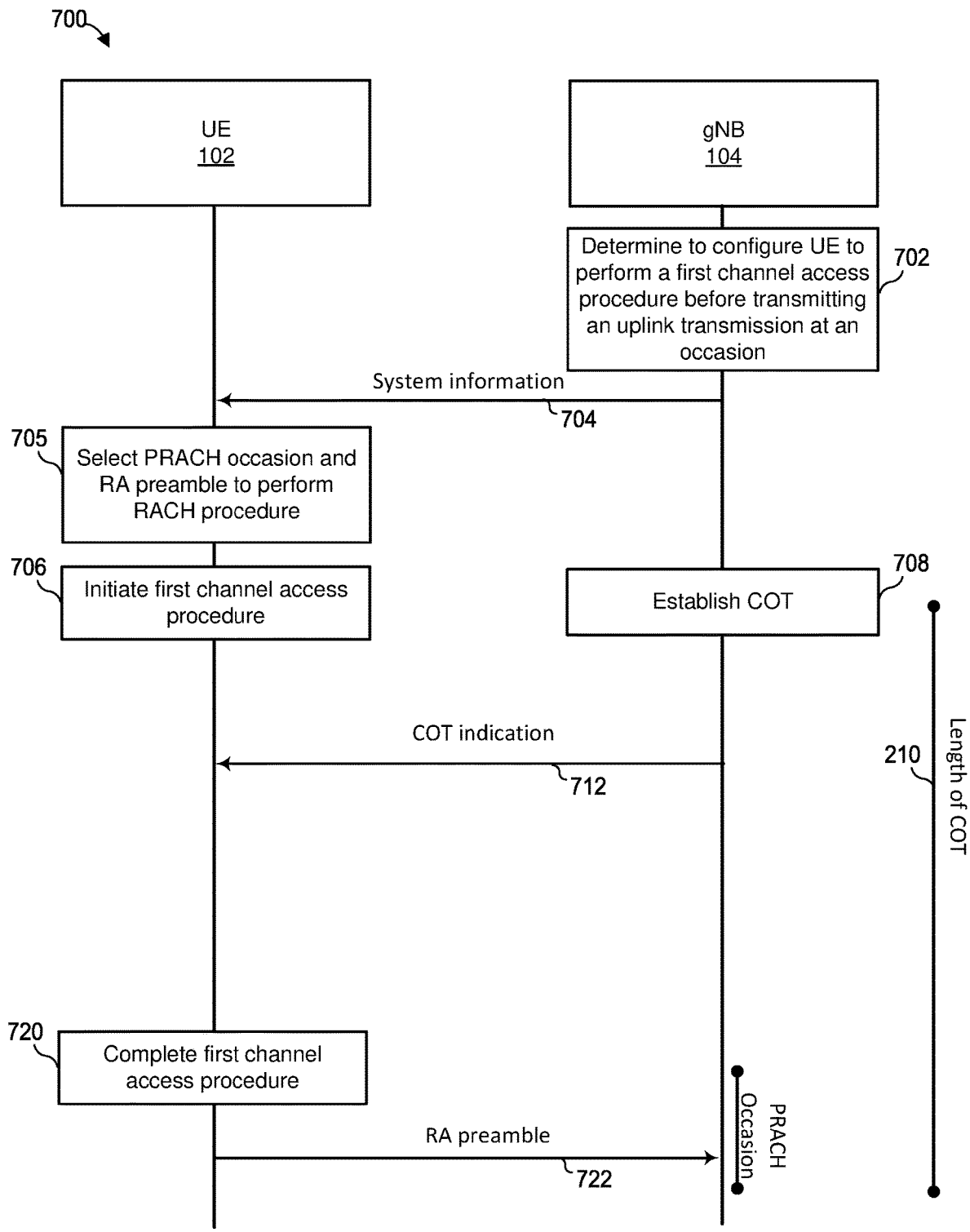
FIG. 7B is an example message flow diagram for a UE completing a first channel access procedure when a base station (i) establishes a COT while the UE has already initiated a RACH procedure and the first channel access procedure, and (ii) provides the UE with an occasion, within the COT, at which the UE can transmit an uplink transmission to the base station.

In other embodiments, under fair co-existence considerations to other compatible devices sharing the unlicensed carrier that are configured to perform respective first channel access procedures, the UE 102 may continue to perform and complete the first channel access procedure in response to the COT indication, as illustrated in event 720 of FIG. 7B, and subsequently transmit 722 the RA preamble to the gNB 104 at the PRACH occasion. That is, the UE 102 continues to perform the first type channel access procedure, even if the UE 102 determines that the PRACH occasion is within the COT.

Figure 8:
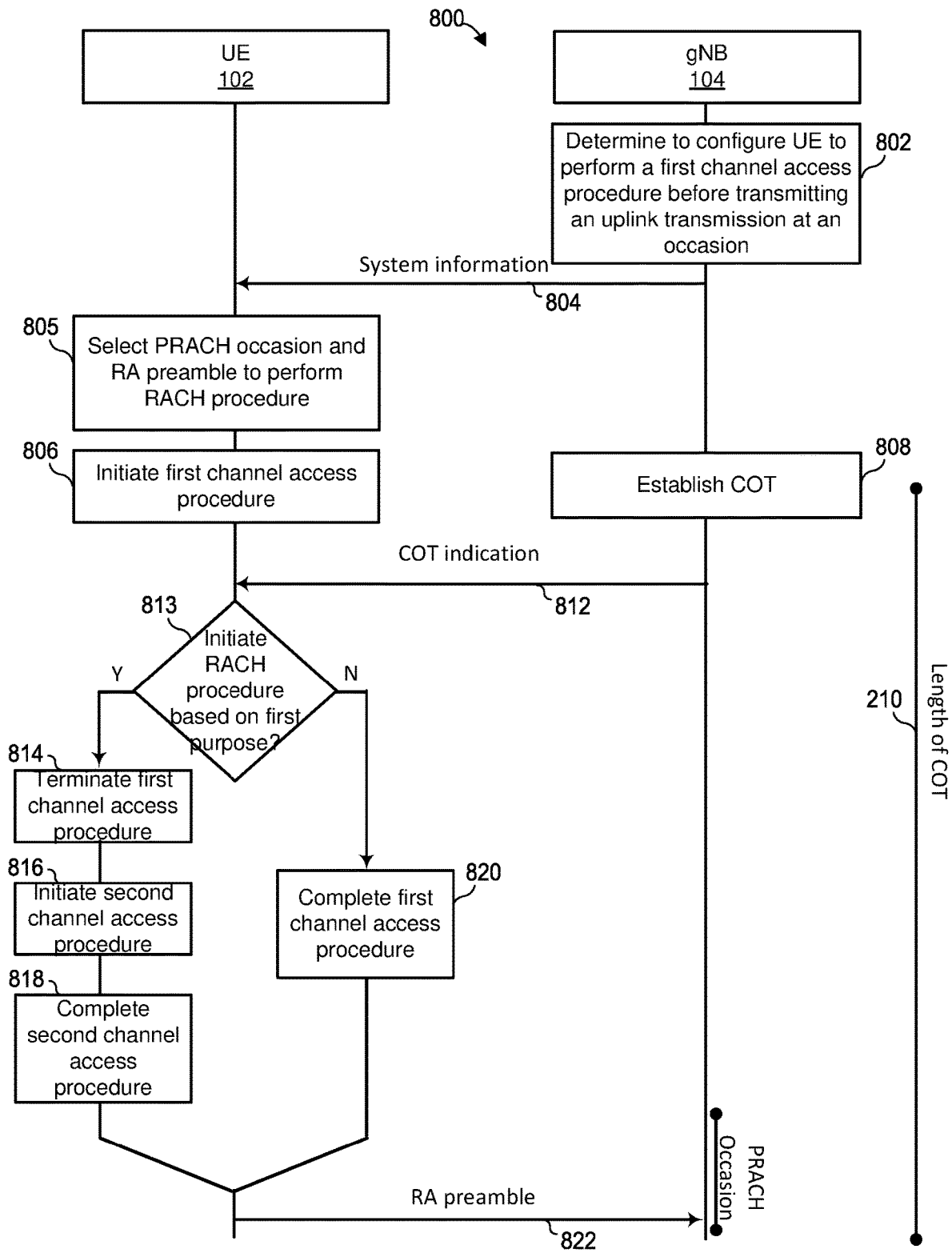
FIG. 8 is an example message flow diagram for a UE performing a second channel access procedure or completing a first channel access procedure based at least in part on a purpose for initiating a RACH procedure when a base station (i) establishes a COT while the UE has already initiated the RACH procedure and the first channel access procedure, and (ii) provides the UE with an occasion, within the COT, at which the UE can transmit an uplink transmission to the base station.

Now referring to FIG. 8, at the beginning of a scenario 800, the UE 102 is in a disengaged state with gNB 104. The UE 102 and base station 104 proceed to events 802, 804, 805, 806, 808 and 812, similar to events 702, 704, 705, 706, 708, and 712.

In response to receiving the COT indication, the UE 102 performs either the first channel access procedure or the second channel access procedure by determining 813 the purpose by which the UE 102 initiated the RACH procedure. If the purpose is of a first type, the UE 102 can terminate 814 the first channel access procedure, initiate 816 the second channel access procedure, and complete 818 the second channel access procedure, similar to events 314, 316, and 318. Otherwise, if the purpose is of a second type, the UE 102 can continue to perform and complete 820 the first channel access procedure, similar to event 320. In some embodiments, the first type of purpose can be to perform a 2-step RACH (i.e. the UE 102 transmits a message A that includes the preamble and a PUSCH transmission), and the second type of purpose can be to perform 4-step RACH, or vice versa. In other embodiments, the first type can be to initiate an RRC connection establishment procedure (if the UE 102 is in idle state) or an RRC connection resume procedure (if the UE 102 is in inactive state), and the second type of purpose can be to request for on-demand system information, or vice versa. In yet other embodiment, the first type of purpose can be associated to a first RRC connection establishment cause (e.g., when making an emergency call or answering a mobile terminated call), and the second type of purpose can be associated to a second RRC connection establishment cause (e.g., sending mobile originating data), or vice versa. In some implementations, a PUSCH radio resource for the PUSCH transmission may be indicated in the broadcasted system information by gNB 104. For example, the broadcasted system information may include a PUSCH configuration configuring the PUSCH radio resource. The PUSCH radio resource may consist of contiguous subcarriers and/or non-contiguous subcarriers. One or more PUSCH occasions for the PUSCH transmission may also be indicated in the broadcasted system information by gNB 104. UE 102 may transmit the PUSCH transmission on the PUSCH radio resource at the one or more PUSCH occasions.

In response to either completing 818 the second channel access procedure or completing 820 the first channel access procedure, the UE 102 transmits 822 the RA preamble to the gNB 104 at the RACH occasion, similar to event 722.

Figure 9:
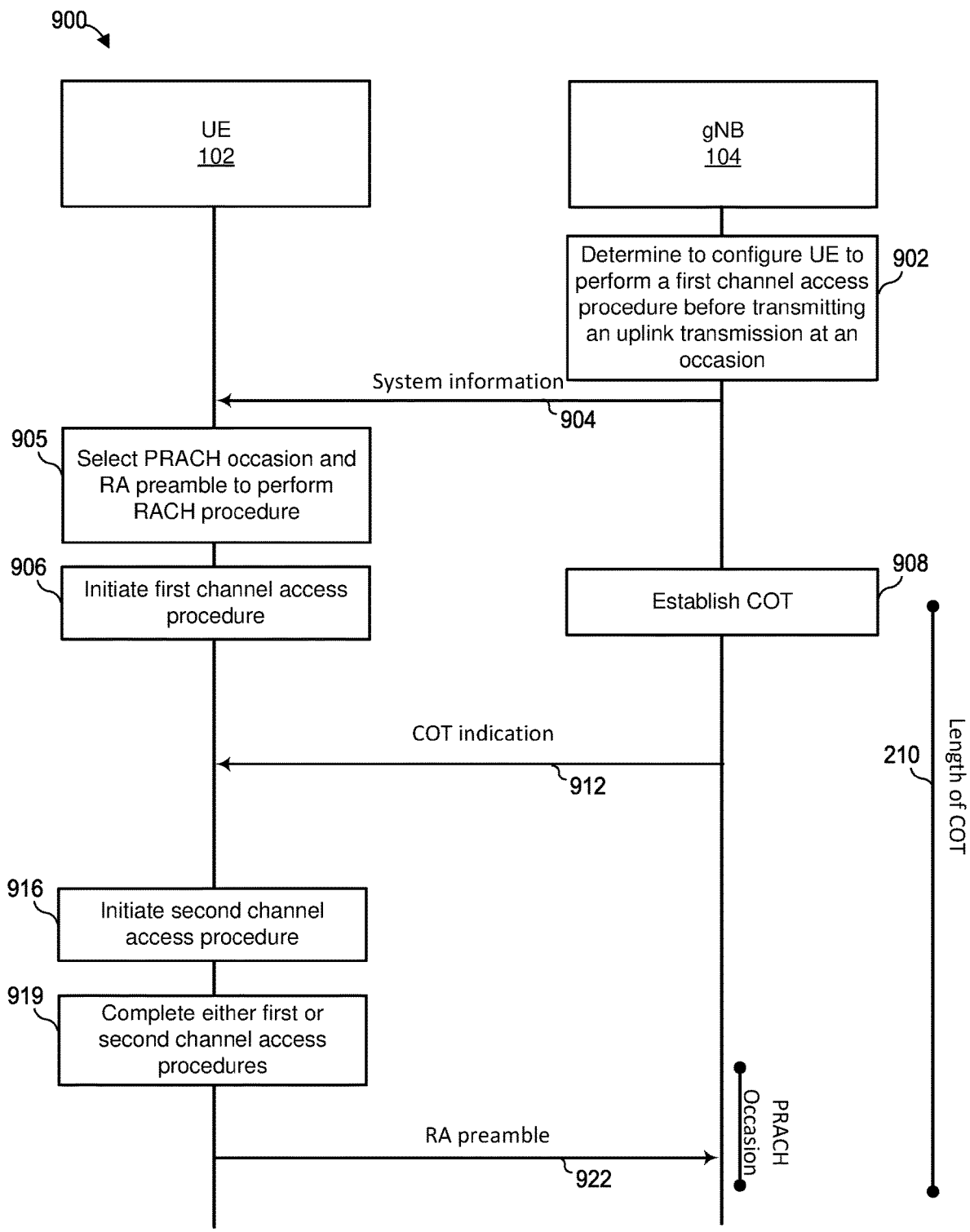
FIG. 9 is an example message flow diagram for a UE performing a first channel access procedure and a second channel access procedure in parallel when a base station (i) establishes a COT while the UE has already initiated a RACH procedure and the first channel access procedure, and (ii) provides the UE with an occasion, within the COT, at which the UE can transmit an uplink transmission to the base station.

Now referring to FIG. 9, at the beginning of a scenario 900, the UE 102 is either in a connected state or disengaged state with gNB 104. The UE 102 and base station 104 proceed to events 902, 904, 905, 906, 908 and 912, similar to events 702, 704, 705, 706, 708, and 712.

In response to receiving the COT indication, the UE 102 initiates 916 the second channel access procedure, similar to event 416. Accordingly, the UE 102 performs the first channel access procedure and the second channel access procedure in parallel. In some embodiments, if the UE 102 completes the second channel access procedure while performing the first type channel access procedure, the UE 102 may terminate the first channel access procedure. In other embodiments, if the UE 102 completes the second type channel access procedure while performing the first type channel access procedure, the UE 102 may continue performing the first type channel access procedure. In yet other embodiments, if the UE 102 completes the first channel access procedure while performing the second channel access procedure, the UE 102 may terminate the second channel access procedure. In yet other embodiments, if the UE 102 completes the first type channel access procedure while performing the second channel access procedure, the UE 102 may continue performing the second channel access procedure. Accordingly, the UE 102 completes 919 the first channel access procedure and/or the second channel access procedure, similar to event 419.

In response to completing the first channel access procedure and/or the second channel access procedure, the UE 102 transmits 922 the RA preamble to the gNB 104 at the occasion, similar to event 722. If the UE 102 completes the first channel access procedure and/or the second channel access procedure before the PRACH occasion and the RACH procedure is a 2-step RACH procedure, the UE 102 may transmit the RA preamble at the PRACH occasion and a PUSCH transmission associated to the RA preamble. In some implementations, a PUSCH radio resource for the PUSCH transmission may be indicated in the broadcasted system information by gNB 104. For example, the broadcasted system information may include a PUSCH configuration configuring the PUSCH radio resource. The PUSCH radio resource may consist of contiguous subcarriers and/or non-contiguous subcarriers. One or more PUSCH occasions for the PUSCH transmission may also be indicated in the broadcasted system information by gNB 104. UE 102 may transmit the PUSCH transmission on the PUSCH radio resource at the one or more PUSCH occasions.

Figure 10A:
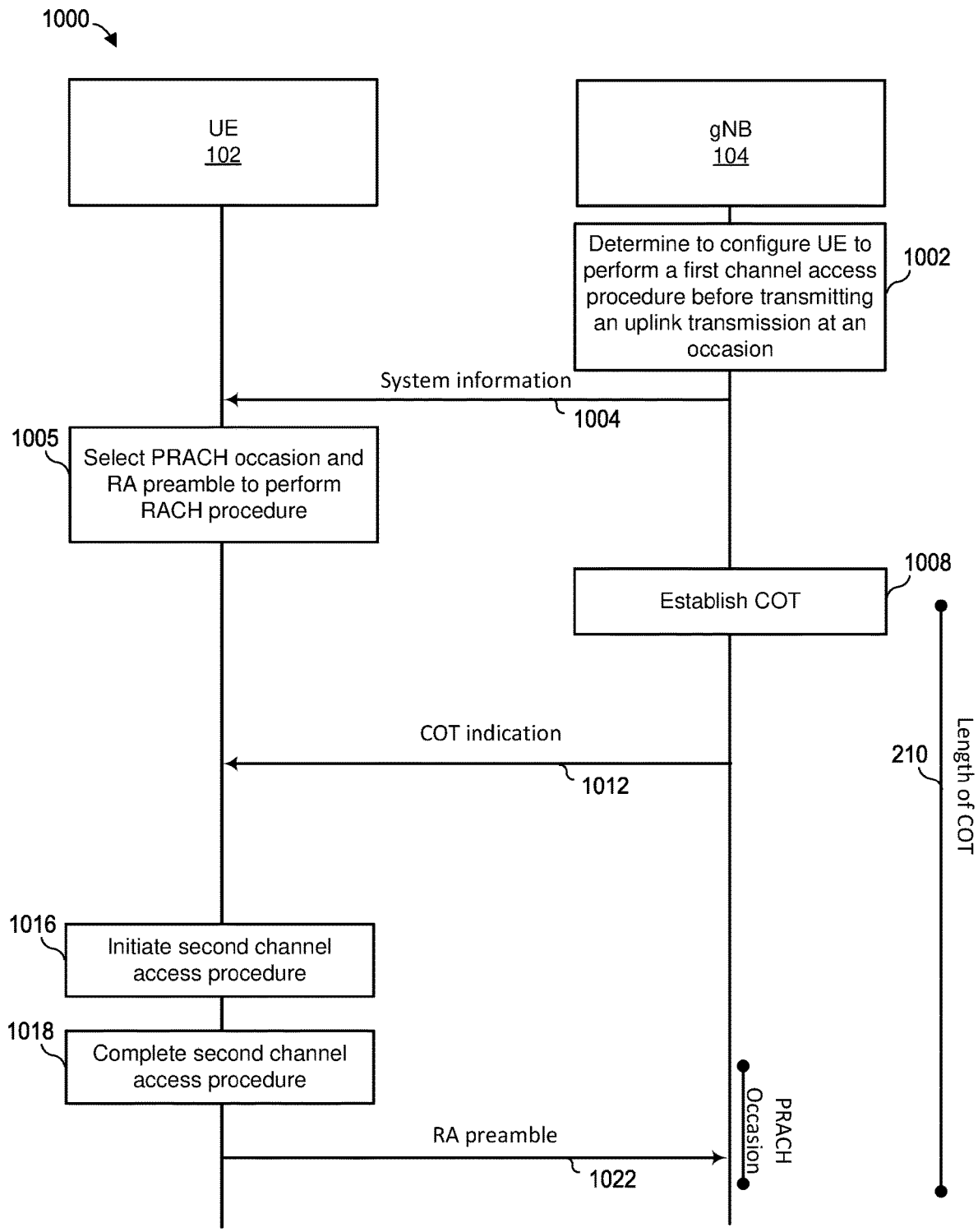
FIG. 10A is an example message flow diagram for a UE performing a second channel access procedure when a base station (i) establishes a COT before the UE has initiated the second channel access procedure but after the UE initiated a RACH procedure, and (ii) provides the UE with an occasion, within the COT, at which the UE can transmit an uplink transmission to the base station.
Figure 10B:
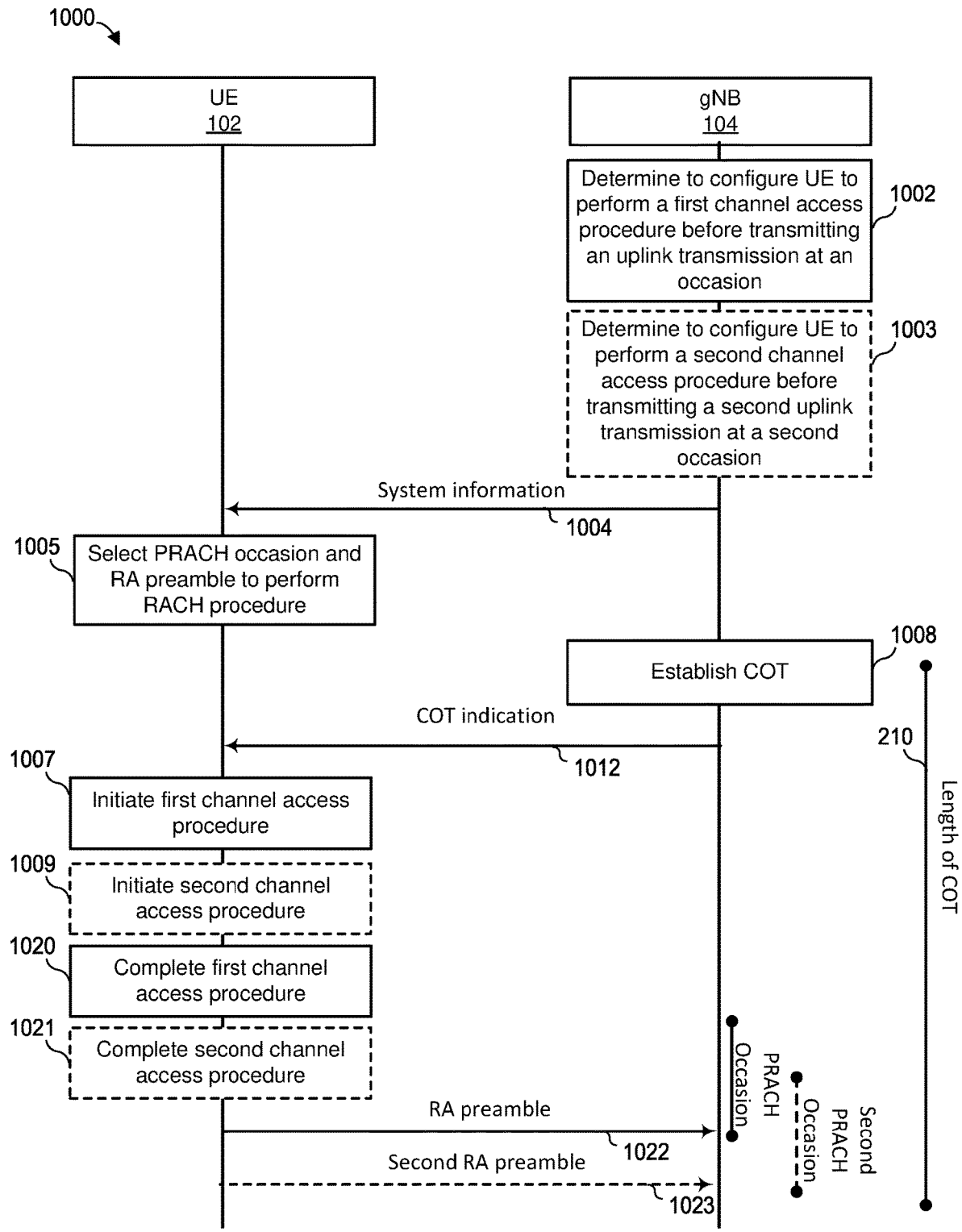
FIG. 10B is an example message flow diagram for a UE performing a first channel access procedure when a base station (i) establishes a COT before the UE has initiated the first channel access procedure but after the UE initiated a RACH procedure, and (ii) provides the UE with an occasion, within the COT, at which the UE can transmit an uplink transmission to the base station.
Figure 11:
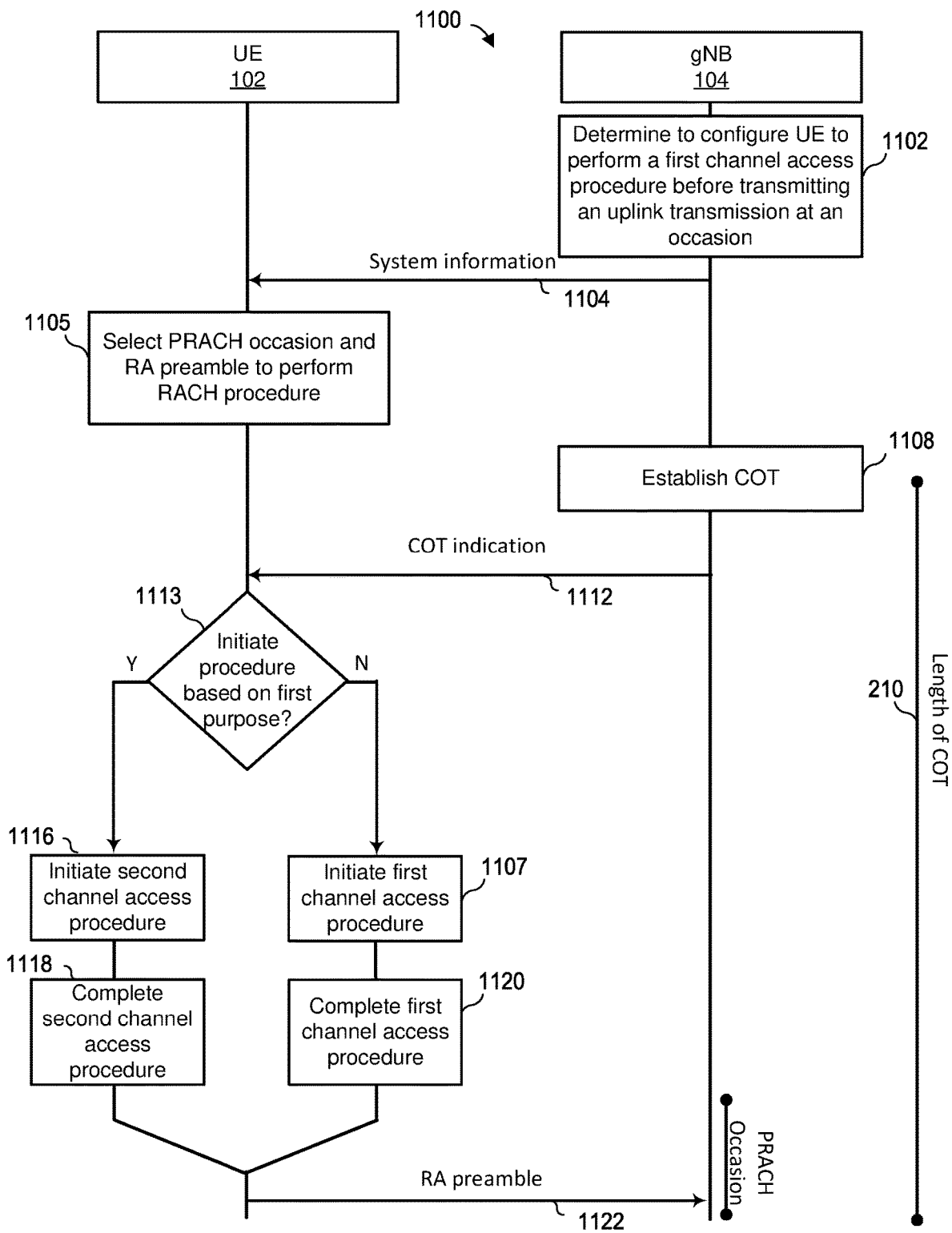
FIG. 11 is an example message flow diagram for a UE performing a first channel access procedure or a second channel access procedure based at least in part on a purpose for initiating a RACH procedure when a base station (i) establishes a COT before the UE has initiated the channel access procedure but after the UE initiated the RACH procedure, and (ii) provides the UE with an occasion, within the COT, at which the UE can transmit an uplink transmission to the base station.

Now turning to FIGS. 10A-10B and 11, these figures generally illustrate example message flow diagrams for a UE performing a channel access procedure when a base station (i) establishes a COT before the UE has initiated the channel access procedure but after the UE initiated a RACH procedure, and (ii) provides the UE with an occasion, within the COT, at which the UE can transmit an uplink transmission to the base station.

Now referring to FIG. 10A, at the beginning of a scenario 1000, the UE 102 is in a disengaged state with gNB 104. The UE 102 and base station 104 proceed to events 1002, 1004, and 1005, similar to events 702, 704, and 705. In contrast to the scenario 700 in which UE 102 initiates the first channel access procedure while the gNB 104 establishes the COT and subsequently receives the COT indication from the gNB 104 after initiating the first channel access procedure, UE 102 of scenario 1000 initiates 1016 the second channel access procedure instead of the first channel access procedure, similar to event 516, after receiving 1012 the COT indication, similar to event 512. Accordingly, the UE 102 does not initiate the first channel access procedure at all, despite receiving 1004 system information indicating the UE 102 to perform the first channel access procedure.

As such, the UE 102 is likely to complete 1018 the second channel access procedure, and subsequently transmit 1022 the RA preamble to the gNB 104 at the PRACH occasion, similar to events 518 and 722.

In other embodiments, under fair co-existence considerations to other compatible devices sharing the unlicensed carrier that are configured to perform respective first channel access procedures, the UE 102 may initiate 1007 the first channel access procedure, similar to event 507, after receiving 1012 the COT indication, similar to event 512, complete the first channel access procedure in response to the COT indication, as illustrated in event 1020 of FIG. 10B, and subsequently transmit 1022 the RA preamble to the gNB 104 at the PRACH occasion, similar to event 722. That is, the UE 102 continues to perform the first type channel access procedure, even if the UE 102 determines that the PRACH occasion is within the COT.

In yet other embodiments, as illustrated in event 1003 of FIG. 10B, the gNB 104 may, alternatively or in addition to determining the UE 102 with a configuration as shown in event 1002, determine 1003 to configure the UE 102 with a second uplink grant indicating that the UE 102 can transmit a second RA preamble using a second resource at a second occasion (e.g., a second PRACH occasion). The gNB 104 also determines 1003 another channel access procedure (e.g., a second channel access procedure) that the UE 102 should use prior to transmitting the second RA preamble at the second occasion. The gNB 104 indicates 1005 the second channel access procedure and second occasion to the UE 102 by broadcasting 1004 system information.

In response to receiving 1012 the COT indication, if the UE 102 determines that the second occasion is within the COT, the UE 102 initiates 1009 the second channel access procedure having a different type as that of the first channel access procedure on the unlicensed carrier frequency, and completes 1021 the second channel access procedure before transmitting 1023 the second RA preamble to the gNB 104.

Now referring to FIG. 11, at the beginning of a scenario 1100, the UE 102 is in a disengaged state with gNB 104. The UE 102 and base station 104 proceed to events 1102, 1104, 1105, 1108 and 1112, similar to events 702, 704, 705, 608 and 612.

In response to receiving the COT indication, the UE 102 performs either the first channel access procedure or the second channel access procedure by determining 1113 the purpose by which the UE 102 initiated the RACH procedure, similar to event 813. If the purpose is of a first type, the UE 102 can initiate 1116 the second channel access procedure, and complete 1118 the second channel access procedure, similar to events 616, and 618. Otherwise, if the purpose transmission is of a second type, the UE 102 initiates 1107 the first channel access procedure, and completes 1120 the first channel access procedure, similar to events 607 and 620.

In response to either completing 1118 the second channel access procedure or completing 1120 the first channel access procedure, the UE 102 transmits 1122 the RA preamble to the gNB 104 at the PRACH occasion, similar to event 722.

Now turning to FIGS. 12-15, these figures generally illustrate example message flow diagrams for a UE performing a channel access procedure when a base station (i) establishes a COT, and (ii) provides the UE with an occasion, outside the COT, at which the UE can transmit an uplink transmission to the base station.

Figure 12:
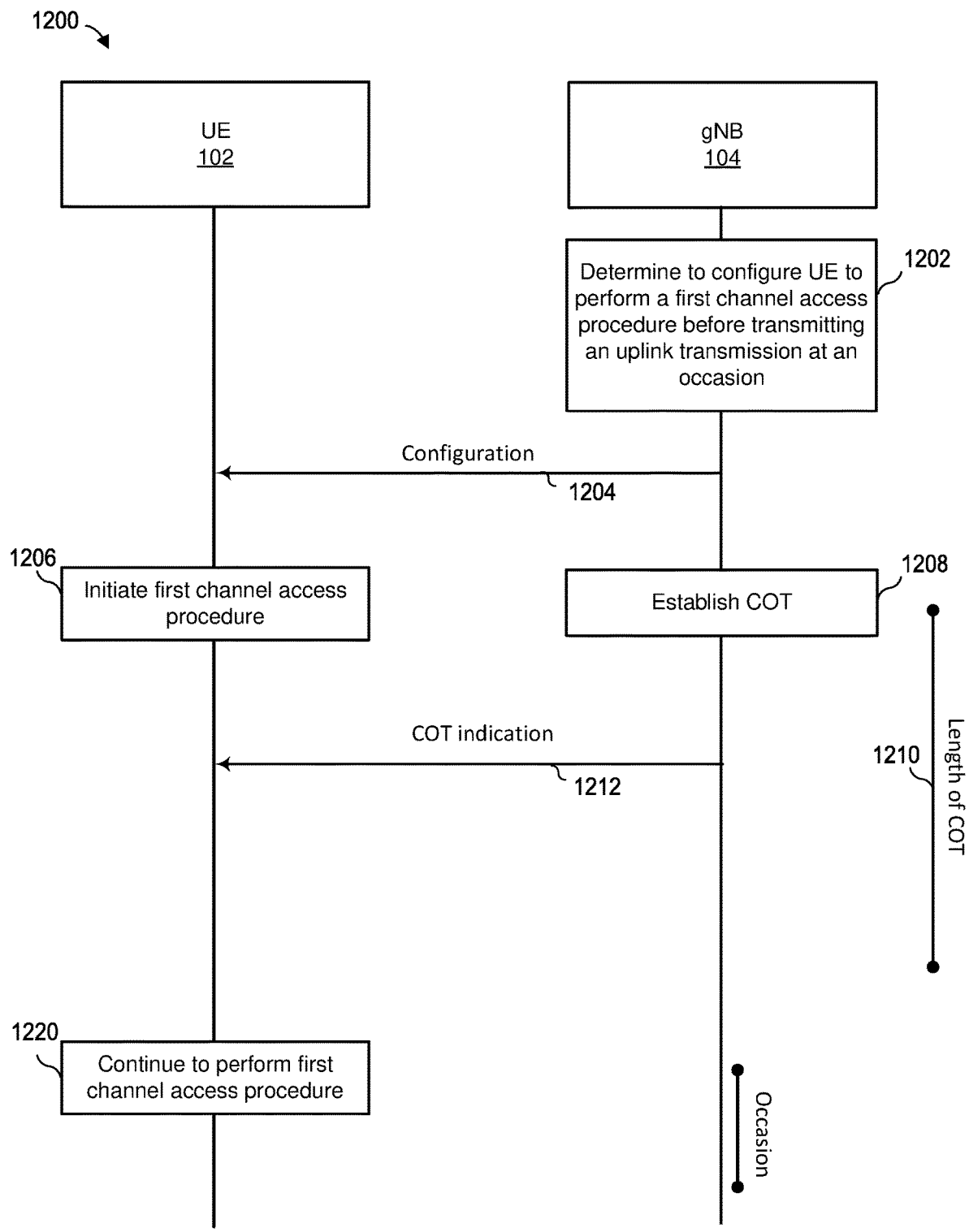
FIG. 12 is an example message flow diagram for a UE performing a first channel access procedure when a base station (i) establishes a COT while the UE has already initiated the first channel access procedure, and (ii) provides the UE with an occasion, outside the COT, at which the UE can transmit an uplink transmission to the base station.

Now referring to FIG. 12, the UE 102 is in connected state with gNB 104 in an example scenario 1200, and the gNB 104 determines 1202 to configure the UE 102 with an uplink grant indicating that the UE 102 can transmit the uplink transmission on a certain physical uplink shared channel (PUSCH) using a resource at a certain occasion (e.g., PDCCH occasion), and a certain channel access procedure (e.g., a first channel access procedure) that the UE 102 should use prior to transmitting the uplink transmission at the occasion, similar to events 202, 302, and 402. The gNB 104 indicates 1204 the channel access procedure and occasion to the UE 102, similar to events 204, 304, and 404.

With continued reference to FIG. 12, in response to the configuration message, the UE 102 initiates 1206 the first channel access procedure, similar to events 206, 306, and 406. While the UE 102 performs the first channel access procedure, the gNB 104 gains access to the shared carrier to establish 1208 the COT, similar to events 208, 308, and 408. After the gNB 104 establishes the COT, the gNB 104 indicates to the UE 102 that the COT has started. To indicate to the UE 102 that the COT has started, the gNB 104 may transmit 1212 a COT indication, similar to events 212, 312, and 412.

In response to such COT indication, if the UE 102 determines that the occasion is outside the COT, the UE 102 continues 1220 to perform the first channel access procedure.

Figure 13:
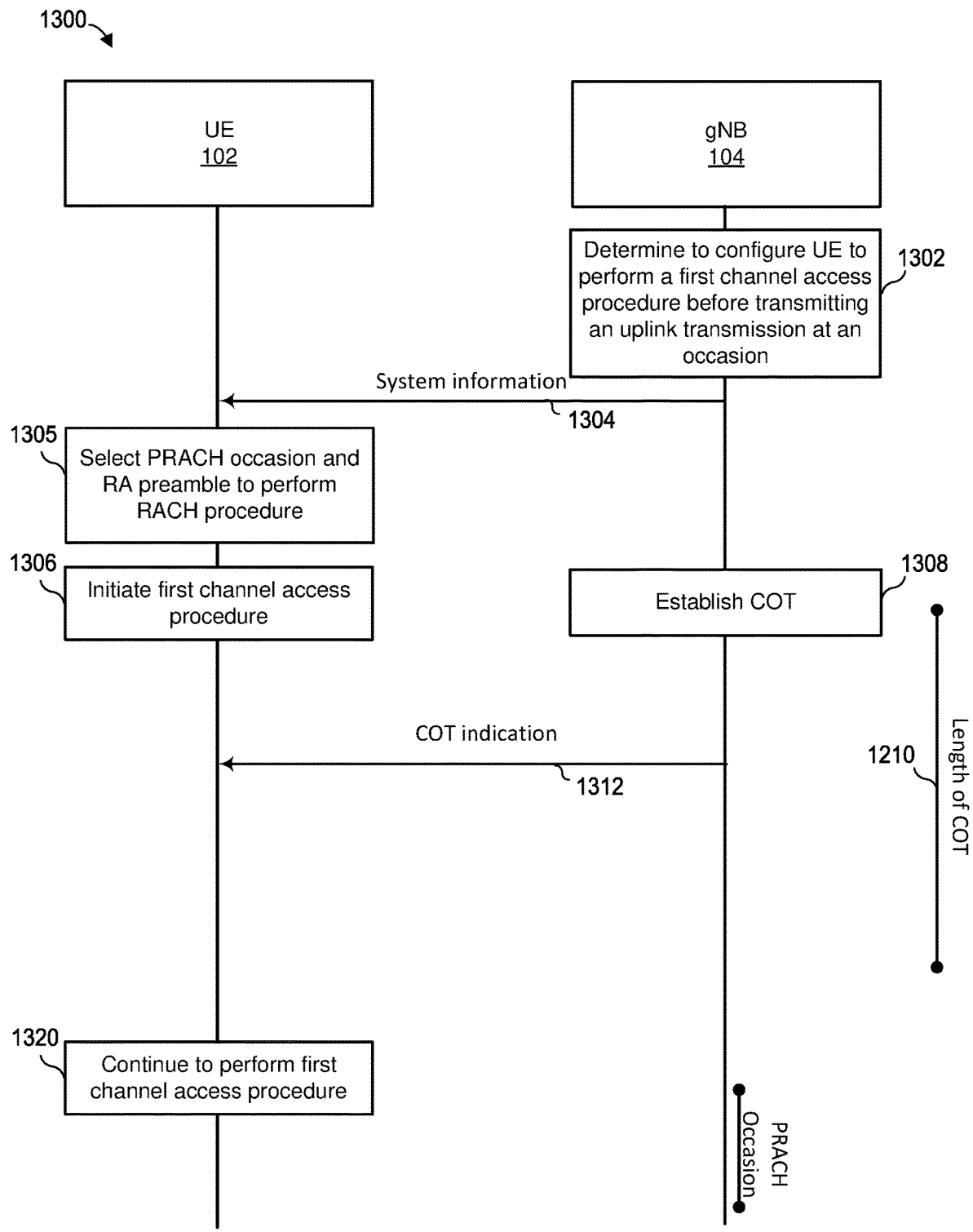
FIG. 13 is an example message flow diagram for a UE performing a first channel access procedure when a base station (i) establishes a COT while the UE has already initiated a RACH procedure and the first channel access procedure, and (ii) provides the UE with an occasion, outside the COT, at which the UE can transmit an uplink transmission to the base station.

Now referring to FIG. 13, at the beginning of a scenario 1300, the UE 102 is in a disengaged state with gNB 104, and the gNB 104 generally determines 1302 to configure the UE 102 to initiate a random access channel (RACH) procedure, such as by broadcasting 1304 information associated with a RACH procedure in system information on the shared carrier to the UE 102, including a certain channel access procedure (e.g., a first channel access procedure) that the UE 102 should use prior to transmitting the RA preamble at the PRACH occasion, similar to events 702, 802, and 902.

With continued reference to FIG. 13, in response to receiving the broadcasted system information, the UE 102 selects the PRACH occasion and the RA preamble to initiate 1305 the RACH procedure, similar to events 705, 805, and 905. To ultimately transmit the RA preamble at the PRACH occasion to the gNB 104, the UE 102 initiates 1306 the first channel access procedure, similar to event 706, 806, and 906. While the UE 102 performs the first channel access procedure, the gNB 104 gains access to the shared carrier to establish 1308 the COT, similar to events 708, 808, and 908. After the gNB 104 establishes the COT, the gNB 104 indicates to the UE 102 that the COT has started. To indicate to the UE 102 that the COT has started, the gNB 104 may transmit 1312 a COT indication, similar to events 712, 812, and 912.

In response to such COT indication, if the UE 102 determines that the PRACH occasion is outside the COT, the UE 102 continues 1320 to perform the first channel access procedure.

Figure 14:
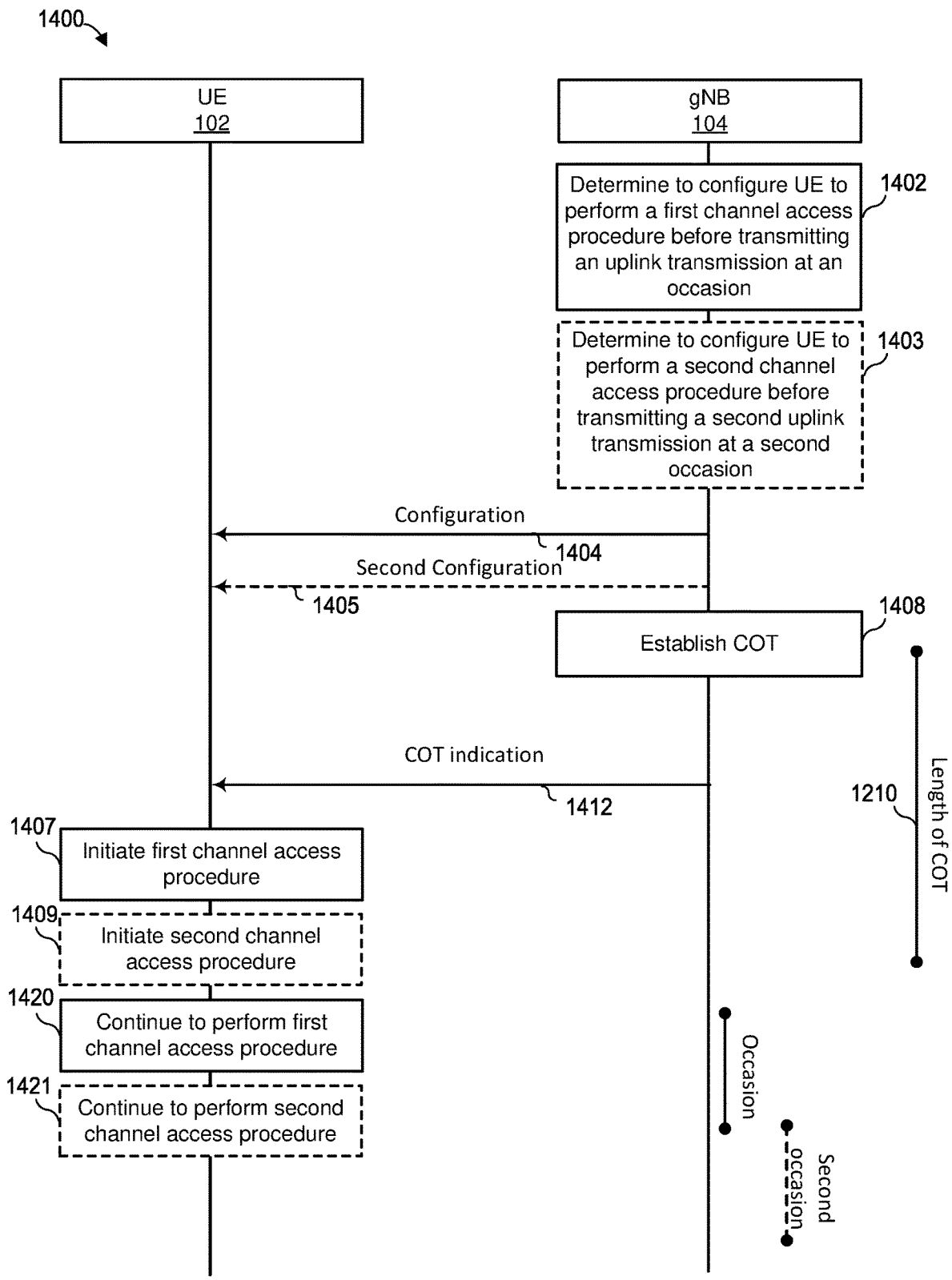
FIG. 14 is an example message flow diagram for a UE performing a first channel access procedure when a base station (i) establishes a COT before the UE has initiated the first channel access procedure, and (ii) provides the UE with an occasion, outside the COT, at which the UE can transmit an uplink transmission to the base station.

Now referring to FIG. 14, the UE 102 is in connected state with gNB 104 in an example scenario 1400, and the gNB 104 determines 1402 to configure the UE 102 with an uplink grant indicating that the UE 102 can transmit the uplink transmission on a certain physical uplink shared channel (PUSCH) using a resource at a certain occasion (e.g., PDCCH occasion), and a certain channel access procedure (e.g., a first channel access procedure) that the UE 102 should use prior to transmitting the uplink transmission at the occasion, similar to events 502 and 602. The gNB 104 indicates 1404 the channel access procedure and occasion to the UE 102, similar to events 504 and 604.

With continued reference to FIG. 14, in response to the configuration message, the UE 102 initiates 1407 the first channel access procedure, similar to event 507, after the gNB 104 establishes 1408 the COT, similar to events 508 and 608, and after receiving 1412 the COT indication, similar to events 512 and 612. If the UE 102 determines that the occasion is outside the COT, the UE 102 continues 1420 to perform the first channel access procedure.

In yet other embodiments, as illustrated in event 1403 of FIG. 14, the gNB 104 may, alternatively or in addition to determining the UE 102 with a configuration as shown in event 1402, determine 1403 to configure the UE 102 with a second uplink grant indicating that the UE 102 can transmit a second uplink transmission on a certain physical uplink shared channel (PUSCH) using a second resource at a second occasion (e.g., a second PDCCH occasion), similar to event 503. The gNB 104 also determines 1403 another channel access procedure (e.g., a second channel access procedure) that the UE 102 should use prior to transmitting the second uplink transmission at the second occasion. The gNB 104 indicates 1405 the second channel access procedure and second occasion (i.e., a second configuration) to the UE 102, similar to event 505.

In response to the second configuration, the UE 102 initiates 1409 the second channel access procedure, similar to event 509, after the gNB 104 establishes 1408 the COT and after receiving 1412 the COT indication. If the UE 102 determines that the occasion is outside the COT, the UE 102 continues 1421 to perform the second channel access procedure.

Figure 15:
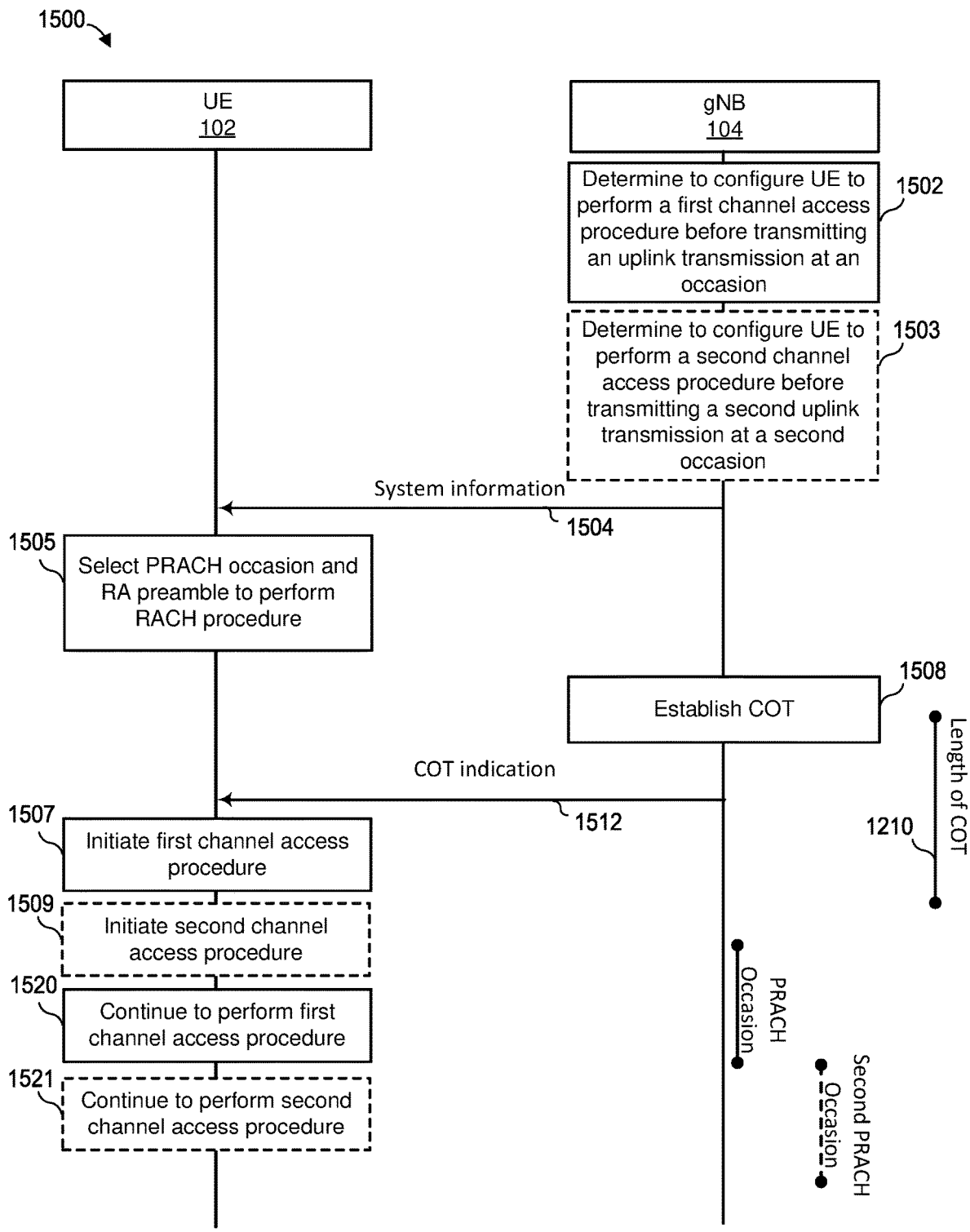
FIG. 15 is an example message flow diagram for a UE performing a first channel access procedure when a base station (i) establishes a COT before the UE has initiated the first channel access procedure but after the UE initiated a RACH procedure, and (ii) provides the UE with an occasion, outside the COT, at which the UE can transmit an uplink transmission to the base station.

Now referring to FIG. 15, at the beginning of a scenario 1500, the UE 102 is in connected state with gNB 104. The UE 102 and base station 104 proceed to events 1502, 1504, 1505, 1508, 1512, and 1507, similar to events 1002, 1102, 1004, 1104, 1005, 1105, 1008, 1108, 1012, 1112, and 1007.

If the UE 102 determines that the PRACH occasion is outside the COT, the UE 102 continues 1520 to perform the first channel access procedure.

In yet other embodiments, as illustrated in event 1503 of FIG. 15, the gNB 104 may, alternatively or in addition to determining the UE 102 with a configuration as shown in event 1502, determine 1503 to configure the UE 102 with a second uplink grant indicating that the UE 102 can transmit a second RA preamble using a second resource at a second occasion (e.g., a second PRACH occasion), similar to event 1003. The gNB 104 also determines 1503 another channel access procedure (e.g., a second channel access procedure) that the UE 102 should use prior to transmitting the second RA preamble at the second occasion. The gNB 104 indicates 1505 the second channel access procedure and second occasion (i.e., a second configuration) to the UE 102, similar to event 1004.

In response to the second configuration, the UE 102 initiates 1509 the second channel access procedure, similar to event 1009, after the gNB 104 establishes 1508 the COT and after receiving 1512 the COT indication. If the UE 102 determines that the occasion is outside the COT, the UE 102 continues 1521 to perform the second channel access procedure.

Figure 16:
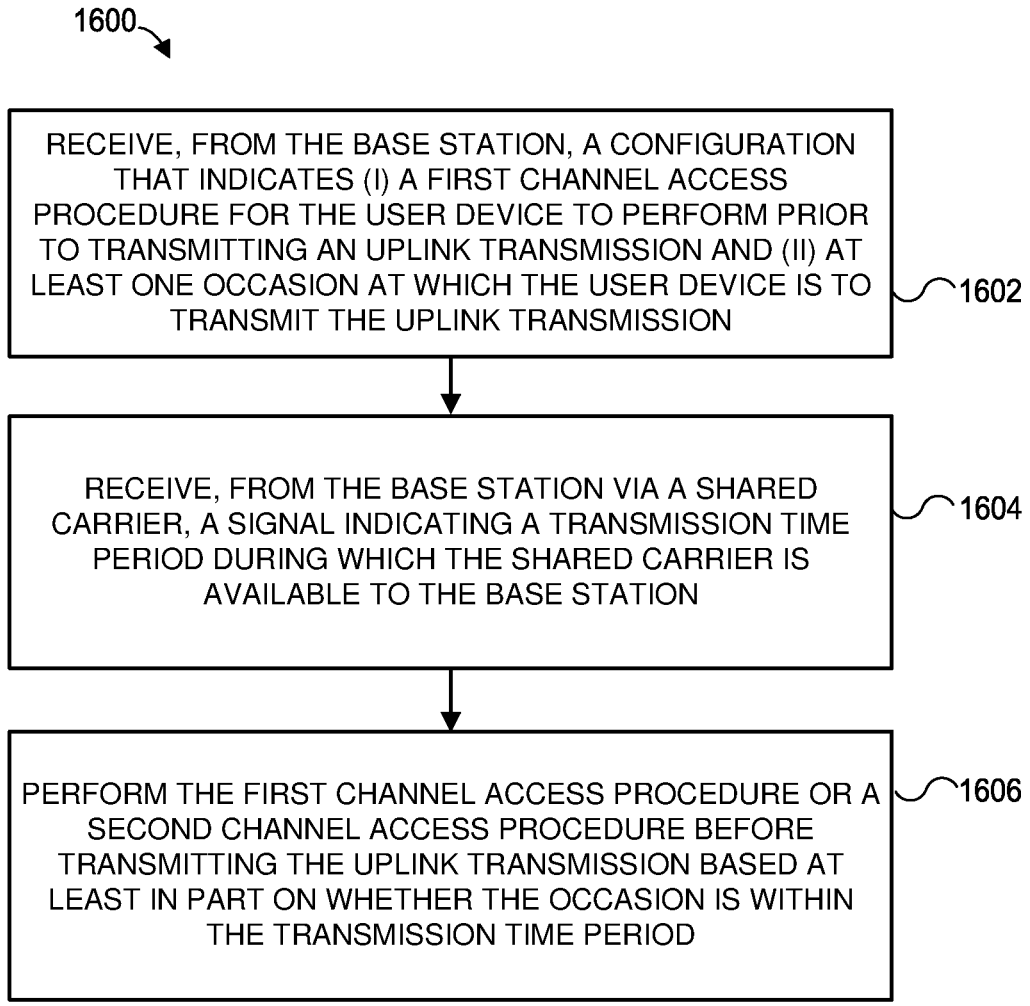
FIG. 16 is a flow diagram of an example method for scheduling an uplink transmission assignment, which can be implemented in the user device of FIG. 1.

FIG. 16 depicts an example method 1600 for scheduling an uplink transmission assignment with a base station that communicates with the user device via a shared carrier, which the UE 102 can implement.

The method 1600 begins at block 1602, where a UE receives, from a base station, a configuration that indicates (i) a first channel access procedure for the user device to perform prior to transmitting an uplink transmission and (ii) at least one occasion at which the user device is to transmit the uplink transmission (events 204, 304, 404, 504, 604, 704, 804, 904, 1004, 1104, 1204, 1304, 1404, and 1504 of FIGS. 2-15). In addition, the UE at block 1604 receives, from the base station via the shared carrier, a signal indicating at least a portion of a transmission time period during which the shared carrier is available to the base station (events 212, 312, 412, 512, 612, 712, 812, 912, 1012, 1112, 1212, 1312, 1412, and 1512 of FIGS. 2-15). In response to the signal, the UE at block 1606 performs the first channel access procedure or a second channel access procedure before transmitting the uplink transmission based at least in part on whether the occasion is within the transmission time period (events 206, 216, 306, 316, 406, 416, 516, 507, 616, 607, 706, 716, 806, 816, 906, 916, 1016, 1007, 1116, 1107, 1206, 1306, 1407, and 1507 of FIGS. 2-15).

Figure 17:
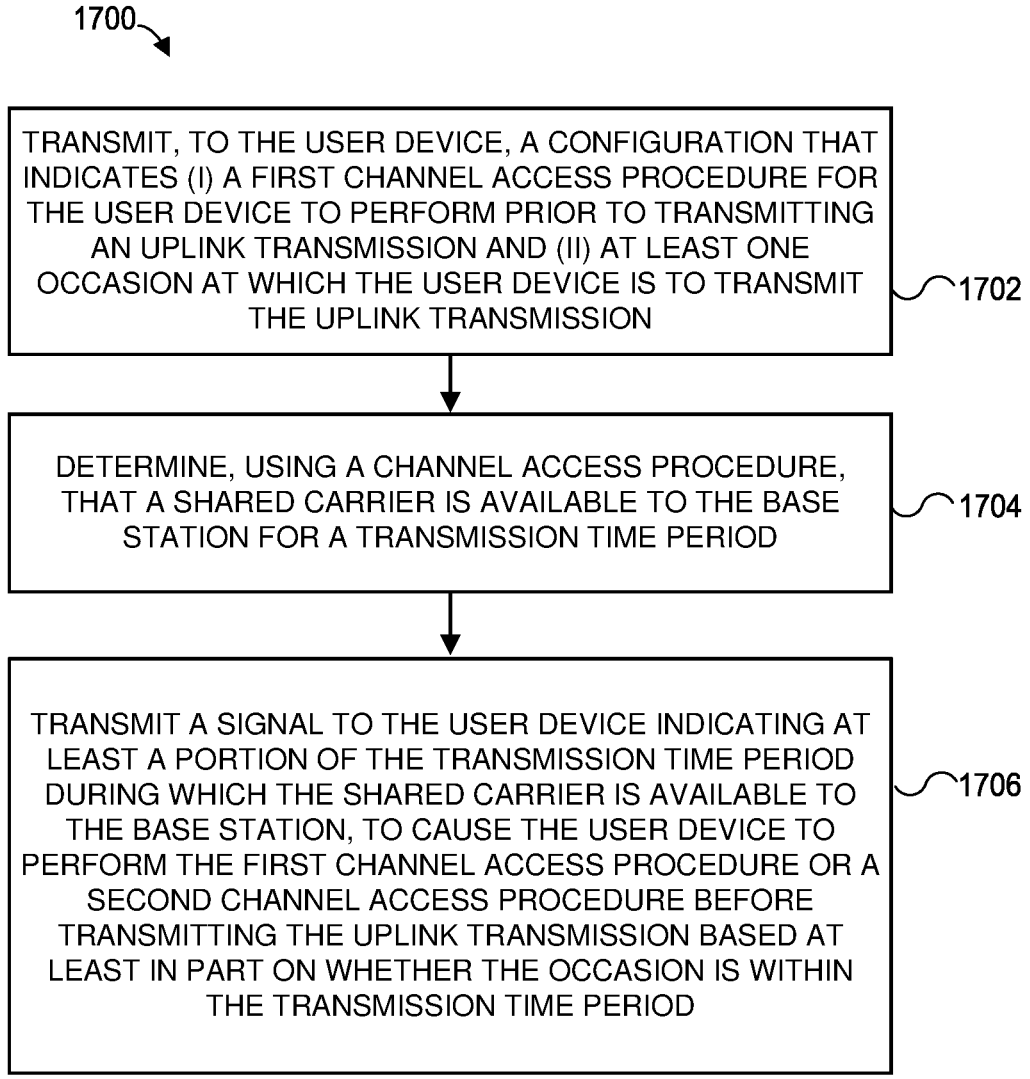
FIG. 17 is a flow diagram of an example method for providing control channel information to a user device, which can be implemented in the base station of FIG. 1.

FIG. 17 depicts an example method 1600 of providing control channel information to a user device that communicates with the base station via a shared carrier, which the base station 104 can implement.

The method 1700 begins at block 1702, where a base station transmits, to a UE, a configuration that indicates (i) a first channel access procedure for the user device to perform prior to transmitting an uplink transmission and (ii) at least one occasion at which the user device is to transmit the uplink (events 204, 304, 404, 504, 604, 704, 804, 904, 1004, 1104, 1204, 1304, 1404, 1504 of FIGS. 2-15). In addition, the base station at block 1704 determines, using a channel access procedure, that the shared carrier is available to the base station for a transmission time period (events 208, 308, 408, 508, 608, 708, 808, 908, 1008, 1108, 1208, 1308, 1408, and 1508 of FIGS. 2-15). In response to the determination, the base station at block 1706 transmits a signal to the UE indicating at least a portion of the transmission time period during which the shared carrier is available to the base station, to cause the UE to perform the first channel access procedure or a second channel access procedure before transmitting the uplink transmission based at least in part on whether the occasion is within the transmission time period (events 212, 312, 412, 512, 612, 712, 812, 912, 1012, 1112, 1212, 1312, 1412, and 1512 of FIGS. 2-15).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for scheduling an uplink transmission assignment through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a user device for scheduling an uplink transmission assignment with a base station that communicates with the user device via a shared carrier, the method comprising: receiving, by processing hardware of the user device and from the base station, a configuration that indicates (i) a first channel access procedure for the user device to perform prior to transmitting an uplink transmission and (ii) at least one occasion at which the user device is to transmit the uplink transmission; receiving, by the processing hardware and from the base station via the shared carrier, a signal indicating at least a portion of a transmission time period during which the shared carrier is available to the base station; and performing, by the processing hardware, the first channel access procedure or a second channel access procedure before transmitting the uplink transmission based at least in part on whether the occasion is within the transmission time period.

Aspect 2. The method of aspect 1, wherein the performing comprises: performing the first channel access procedure in response to determining that the occasion is within the transmission time period.

Aspect 3. The method of aspect 2, wherein the performing comprises: completing the first channel access procedure before transmitting the uplink transmission if the user device has initiated the first channel access procedure prior to receiving the signal.

Aspect 4. The method of aspect 2, wherein the performing comprises: initiating and completing the first channel access procedure after receiving the signal if the user device has not initiated the first channel access procedure prior to receiving the signal.

Aspect 5. The method of aspect 1, wherein the performing comprises: performing the second channel access procedure in response to determining, by the processing hardware, that a likelihood of completing the first channel access procedure during the transmission time period is less than a likelihood of completing the second channel access procedure during the transmission time period.

Aspect 6. The method of aspect 5, wherein the performing comprises: terminating the first channel access procedure prior to initiating the second channel access procedure if the user device has initiated the first channel access procedure prior to receiving the signal when the user device is in a connected state.

Aspect 7. The method of aspect 5, wherein the performing comprises: initiating and completing the second channel access procedure after receiving the signal if the user device has not initiated the first channel access procedure prior to receiving the signal when the user device is in a connected state.

Aspect 8. The method of aspect 5, wherein the performing comprises: if the user device has initiated the first channel access procedure prior to receiving the signal when the user device is in a connected state: initiating the second channel access procedure, and completing either the first channel access procedure or the second channel access procedure before transmitting the uplink transmission.

Aspect 9. The method of aspect 5, wherein the performing comprises: if the user device has initiated the first channel access procedure prior to receiving the signal when the user device is in a connected state: determining a type of the uplink transmission; and performing at least one of: terminating the first channel access procedure before initiating and completing the second channel access procedure, if the type is a first type, or completing the first channel access procedure before transmitting the uplink transmission, if the type is a second type.

Aspect 10. The method of aspect 5, wherein the performing comprises: if the user device has not initiated the first channel access procedure prior to receiving the signal when the user device is in a connected state: determining a type of the uplink transmission; and performing at least one of: initiating and completing the second channel access procedure after receiving the signal, if the type is a first type; or initiating and completing the first channel access procedure after receiving the signal, if the type is a second type.

Aspect 11. The method of aspects 9 or 10, including one of: the first type is a physical uplink control channel (PUSCH) and the second type is a sounding reference signal (SRS), the first type is the SRS and the second type is the PUSCH; the first type is the PUSCH and the second type is a physical uplink control channel (PUCCH); the first type is the PUCCH and the second type is the PUSCH; the first type is the SRS and the second type is the PUCCH; the first type is the PUCCH and the second type is the SRS; the first type is the PUSCH and the second type is a random access (RA) preamble; the first type is the RA preamble and the second type is the PUSCH; the first type is the PUSCH and the second type is a message A of a random access channel (RACH) procedure; or the first type is the message A and the second type is the PUSCH.

Aspect 12. The method of aspect 5, wherein the performing comprises: if the user device has initiated the first channel access procedure prior to receiving the signal, performing at least one of: terminating the first channel access procedure prior to initiating and completing the second channel access procedure, if the user device has performed a RACH procedure based at least in part on a first purpose; or completing the first channel access procedure before transmitting the uplink transmission if the user device has performed a RACH procedure based at least in part on a second purpose.

Aspect 13. The method of aspect 5, wherein the performing comprises: if the user device has not initiated the first channel access procedure prior to receiving the signal, performing at least one of: initiating and completing the second channel access procedure after receiving the signal and before transmitting the uplink transmission if the user device has performed a RACH procedure based at least in part on a first purpose; or initiating and completing the first channel access procedure after receiving the signal and before transmitting the uplink transmission if the user device has performed a RACH procedure based at least in part on a second purpose.

Aspect 14. The method of aspects 12 or 13, including one of: the first purpose is a 2-step RACH procedure and the second purpose is a 4-step RACH procedure; the first purpose is the 4-step RACH procedure and the second purpose is the 2-step RACH procedure; the first purpose is an RRC connection resume procedure in the idle state of the user device, and the second purpose is a request for on-demand system information; or the first purpose is the RRC connection resume procedure in the inactive state of the user device, and the second purpose is the request for on-demand system information.

Aspect 15. The method of aspect 1, wherein the performing comprises: performing the first channel access procedure in response to determining that the occasion is outside the transmission time period.

Aspect 16. The method of aspect 15, wherein the performing comprises: completing the first channel access procedure before transmitting the uplink transmission if the user device has initiated the first channel access procedure prior to receiving the signal.

Aspect 17. The method of aspect 15, wherein the performing comprises: completing the first channel access procedure after receiving the signal if the user device has not initiated the first channel access procedure prior to receiving the signal.

Aspect 18. The method of aspects 3-4, 6-7, 8, 12-14, or 16-17, wherein the receiving comprises receiving the configuration that indicates (i) a random access channel (RACH) procedure as the first channel access procedure and (ii) a physical RACH (PRACH) occasion and a random access (RA) preamble as the occasion, the method further comprising: selecting the PRACH occasion and the RA preamble to perform the RACH procedure according to the configuration when the user device is in the idle state or the inactive state; wherein transmitting the uplink transmission comprises transmitting the RA preamble.

Aspect 19. The method of aspects 4 or 17, further comprising: receiving, from the base station, a second configuration that indicates (i) the second channel access procedure for the user device to perform prior to transmitting a second uplink transmission and (ii) a second occasion at which the user device is to transmit the second uplink transmission; and performing, the second channel access procedure before transmitting the second uplink transmission regardless of whether the second occasion is within the transmission time period.

Aspect 20. The method of any of the preceding aspects, wherein the configuration or the second configuration is provided in a downlink control information (DCI) message or a radio resource control (RRC) Reconfiguration message transmitted by the base station to the user device.

Aspect 21. The method of any of the preceding aspects, wherein receiving the signal indicating the transmission time period includes receiving a signal indicating a duration of the transmission time period.

Aspect 22. The method of any of the preceding aspects, wherein the uplink transmission and the second uplink transmission are each at least one of a PUSCH transmission, a PUCCH transmission, or a sounding reference signal (SRS), and the configuration and second configuration configures the PUSCH transmission, the PUCCH transmission, or the SRS, respectively.

Aspect 23. The method of any of the preceding aspects, wherein the first channel access procedure is a Category 4 Listen-Before-Talk (LBT) procedure, and the second channel access procedure is at least one of a Category 3 LBT procedure, a Category 2 LBT procedure, or a Category 1 LBT procedure.

Aspect 24. A user device including processing hardware and configured to implement a method according to any of aspects 1-23.

Aspect 25. A method, in a base station, of providing control channel information to a user device that communicates with the base station via a shared carrier, the method comprising: transmitting, by processing hardware of the base station and to the user device, a configuration that indicates (i) a first channel access procedure for the user device to perform prior to transmitting an uplink transmission and (ii) at least one occasion at which the user device is to transmit the uplink transmission; determining, by processing hardware of the base station and using a channel access procedure, that the shared carrier is available to the base station for a transmission time period; and transmitting a signal to the user device indicating at least a portion of the transmission time period during which the shared carrier is available to the base station, to cause the user device to perform the first channel access procedure or a second channel access procedure before transmitting the uplink transmission based at least in part on whether the occasion is within the transmission time period.

Aspect 26. The method of aspect 25, further comprising: transmitting, by processing hardware of the base station and to the user device, a second configuration that indicates (i) the second channel access procedure for the user device to perform prior to transmitting a second uplink transmission and (ii) a second occasion at which the user device is to transmit the second uplink transmission, wherein the transmitting the signal further causes the user device to perform the second channel access procedure before transmitting the second uplink transmission regardless of whether the second occasion is within the transmission time period.

Aspect 27. The method of aspects 25 or 26, wherein the configuration or the second configuration is provided in a downlink control information (DCI) message or a radio resource control (RRC) Reconfiguration message transmitted by the base station to the user device.

Aspect 28. The method of aspects 25 or 26, wherein the configuration or the second configuration is transmitted in a downlink transmission comprising at least one of a physical downlink control channel (PDCCH), a physical downlink shared channel (PDSCH), a channel state information reference signal (CSI-RS), or a synchronization signal block (SSB)).

Aspect 29. The method of aspects 25 or 26, wherein the configuration is included in a first RRC Reconfiguration message and transmitted on a first PDSCH or included in a first DCI and transmitted on the first PDCCH.

Aspect 30. The method of aspect 29, wherein the second configuration is included in the first RRC Reconfiguration message and transmitted on the first PDSCH, included in a second RRC Reconfiguration message and transmitted on a second PDSCH, or included in a second DCI and transmitted on the second PDCCH.

Aspect 31. A base station comprising processing hardware configured to execute a method according to any of one of aspects 25-30.

What is claimed is:

1. A method in a user device for scheduling an uplink transmission with a base station that communicates with the user device via a shared carrier, the method comprising:
receiving, by the user device and from the base station, a configuration that indicates (i) a first channel access procedure for the user device to perform prior to transmitting the uplink transmission and (ii) at least one time-frequency resource at an occasion at which the user device is to transmit the uplink transmission;
initiating, by the user device, the first channel access procedure;
receiving, by the user device and from the base station via the shared carrier, a signal indicating at least a portion of a channel occupancy time (COT) during which the shared carrier is available to the base station; and
performing, by the user device, a second channel access procedure before transmitting the uplink transmission when the occasion is within the COT.

2. The method of claim 1, wherein the performing comprises:
performing the second channel access procedure in response to determining, by the user device, that a likelihood of completing the first channel access procedure during the COT is less than a likelihood of completing the second channel access procedure during the COT.

3. The method of claim 1, wherein the performing comprises:
terminating the first channel access procedure in response to receiving the signal and prior to initiating the second channel access procedure.

4. The method of claim 1, wherein the performing comprises:
if the user device has initiated the first channel access procedure prior to receiving the signal when the user device is in a connected state:
initiating the second channel access procedure, and
completing either the first channel access procedure or the second channel access procedure before transmitting the uplink transmission.

5. The method of claim 1, wherein the performing comprises:
if the user device has initiated the first channel access procedure prior to receiving the signal, performing at least one of:
terminating the first channel access procedure prior to initiating and completing the second channel access procedure, if the user device has performed a random access channel (RACH) procedure based at least in part on a first purpose; or
completing the first channel access procedure before transmitting the uplink transmission if the user device has performed a RACH procedure based at least in part on a second purpose.

6. The method of claim 5, including one of:
the first purpose is a 2-step RACH procedure and the second purpose is a 4-step RACH procedure;
the first purpose is the 4-step RACH procedure and the second purpose is the 2-step RACH procedure;
the first purpose is a radio resource control (RRC) connection resume procedure in an idle state of the user device, and the second purpose is a request for on-demand system information; or the first purpose is the RRC connection resume procedure in an inactive state of the user device, and the second purpose is the request for on-demand system information.

7. The method of claim 1, wherein the performing comprises:
if the user device has not initiated the first channel access procedure prior to receiving the signal, performing at least one of:
  initiating and completing the second channel access procedure after receiving the signal and before transmitting the uplink transmission if the user device has performed a random access channel (RACH) procedure based at least in part on a first purpose; or
  initiating and completing the first channel access procedure after receiving the signal and before transmitting the uplink transmission if the user device has performed a RACH procedure based at least in part on a second purpose.

8. The method of claim 1, wherein the receiving of the configuration comprises receiving a configuration that indicates (i) a random access channel (RACH) procedure as the first channel access procedure and (ii) a physical RACH (PRACH) occasion and a random access (RA) preamble as the occasion, and the method further comprises:
selecting the PRACH occasion and the RA preamble to perform the RACH procedure according to the configuration when the user device is in an idle state or an inactive state, wherein transmitting the uplink transmission comprises transmitting the RA preamble; and
receiving, from the base station, a second configuration that indicates (i) the second channel access procedure for the user device to perform prior to transmitting a second uplink transmission and (ii) a second occasion at which the user device is to transmit the second uplink transmission.

9. The method of claim 8, wherein the configuration or second configuration is provided in a downlink control information (DCI) message or a radio resource control (RRC) Reconfiguration message transmitted by the base station to the user device.

10. The method of claim 8, wherein the uplink transmission and the second uplink transmission are each at least one of a physical uplink shared channel (PUSCH) transmission, a physical uplink control channel (PUCCH) transmission, or a sounding reference signal (SRS), and the configuration and second configuration configures the PUSCH transmission, the PUCCH transmission, or the SRS, respectively.

11. The method of claim 1, wherein the receiving of the signal indicating at least the portion of the COT includes receiving a signal indicating a duration of the COT.

12. The method of claim 1, wherein the first channel access procedure is a Category 4 Listen-Before-Talk (LBT) procedure, and the second channel access procedure is at least one of a Category 3 LBT procedure, a Category 2 LBT procedure, or a Category 1 LBT procedure.

13. The method of claim 1, wherein the receiving of the signal includes receiving a downlink control information (DCI) message.

14. The method of claim 1, wherein the occasion is a Physical Uplink Shared Channel (PUSCH) occasion.

15. A user device for scheduling an uplink transmission with a base station that communicates with the user device via a shared carrier, the user device configured to:
receive, from the base station, a configuration that indicates (i) a first channel access procedure for the user device to perform prior to transmitting the uplink transmission and (ii) at least one time-frequency resource at an occasion at which the user device is to transmit the uplink transmission;
initiate the first channel access procedure;
receive, from the base station via the shared carrier, a signal indicating at least a portion of a channel occupancy time (COT) during which the shared carrier is available to the base station; and
perform a second channel access procedure before transmitting the uplink transmission when the occasion is within the COT.

16. The user device of claim 15, wherein the occasion is a Physical Uplink Shared Channel (PUSCH) occasion.

17. A method, in a base station, of providing control channel information to a user device that communicates with the base station via a shared carrier, the method comprising:
transmitting, by the base station and to the user device, a configuration that indicates (i) a first channel access procedure for the user device to perform prior to transmitting an uplink transmission and (ii) at least one time-frequency resource at an occasion at which the user device is to transmit the uplink transmission;
determining, by the base station and using a channel access procedure, that the shared carrier is available to the base station for a channel occupancy time (COT); and
transmitting, by the base station, a signal to the user device indicating at least a portion of the COT during which the shared carrier is available to the base station, to cause the user device to perform the first channel access procedure or a second channel access procedure before transmitting the uplink transmission based at least in part on whether the occasion is within the COT.

18. The method of claim 17, further comprising:
transmitting, by the base station and to the user device, a second configuration that indicates (i) the second channel access procedure for the user device to perform prior to transmitting a second uplink transmission and (ii) a second occasion at which the user device is to transmit the second uplink transmission,
wherein the transmitting the signal further causes the user device to perform the second channel access procedure before transmitting the second uplink transmission regardless of whether the second occasion is within the COT.

19. The method of claim 17, wherein the occasion is a Physical Uplink Shared Channel (PUSCH) occasion.

* * * * *